(12) United States Patent
Engel et al.

(10) Patent No.: US 9,822,302 B2
(45) Date of Patent: Nov. 21, 2017

(54) LIQUID-CRYSTALLINE MEDIUM

(71) Applicant: Merck Patent GmbH, Darmstadt (DE)

(72) Inventors: Martin Engel, Darmstadt (DE); Thorsten Kodek, Moerfelden-Walldorf (DE); Ingo Almeroth, Bensheim (DE); Rocco Fortte, Frankfurt am Main (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/152,943

(22) Filed: May 12, 2016

(65) Prior Publication Data

US 2016/0333270 A1 Nov. 17, 2016

(30) Foreign Application Priority Data

May 13, 2015 (DE) .................. 10 2015 006 013

(51) Int. Cl.
| | |
|---|---|
| *G02F 1/1333* | (2006.01) |
| *C09K 19/30* | (2006.01) |
| *C09K 19/12* | (2006.01) |
| *C09K 19/54* | (2006.01) |
| *C09K 19/02* | (2006.01) |

(52) U.S. Cl.
CPC ...... *C09K 19/3098* (2013.01); *C09K 19/0216* (2013.01); *C09K 19/12* (2013.01); *C09K 19/3003* (2013.01); *C09K 19/54* (2013.01); *C09K 2019/123* (2013.01); *C09K 2019/301* (2013.01); *C09K 2019/3009* (2013.01); *C09K 2019/3016* (2013.01)

(58) Field of Classification Search
CPC C09K 19/3098; C09K 19/12; C09K 19/3003; C09K 19/54; C09K 19/0216; C09K 2019/123; C09K 2019/3009; C09K 2019/301; C09K 2019/3016; G02F 1/1333
USPC .................. 252/299.01, 299.63; 428/1.1
See application file for complete search history.

(56) References Cited

U.S. PATENT DOCUMENTS

| | | |
|---|---|---|
| 8,043,671 B2 | 10/2011 | Iijima |
| 8,168,081 B2 | 5/2012 | Klasen-Memmer |
| 8,277,684 B2 | 10/2012 | Klasen-Memmer |
| 8,999,460 B2 | 4/2015 | Goebel |
| 9,388,338 B2 | 7/2016 | Li |
| 9,388,339 B2 | 7/2016 | Goebel et al. |
| 2011/0101270 A1 | 5/2011 | Manabe |
| 2014/0110630 A1 | 4/2014 | Goebel et al. |
| 2014/0111730 A1 | 4/2014 | Goebel et al. |

(Continued)

FOREIGN PATENT DOCUMENTS

| | | |
|---|---|---|
| DE | 2126954 A1 | 12/1971 |
| EP | 1184442 A1 | 3/2002 |
| EP | 2182046 A1 | 5/2010 |

(Continued)

OTHER PUBLICATIONS

European Search Report dated Oct. 17, 2016 issued in corresponding EP 16000952 application (3 pages).

(Continued)

*Primary Examiner* — Geraldina Visconti
(74) *Attorney, Agent, or Firm* — Millen White Zelano & Branigan, PC

(57) ABSTRACT

The compounds of the formula I, and a liquid-crystalline medium, preferably having a nematic phase and negative dielectric anisotropy, which comprises a) one or more compounds of the formula I

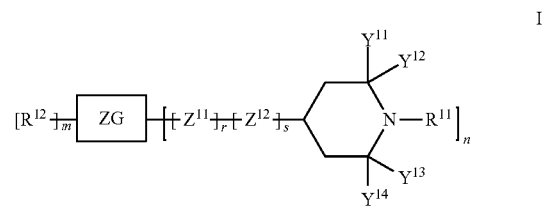

and
b) one or more compounds of the formulae II-1 to II-4,

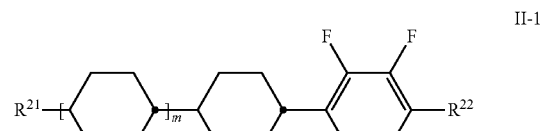

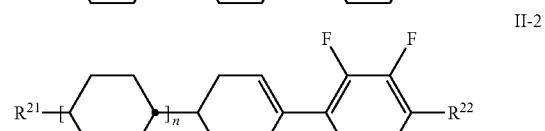

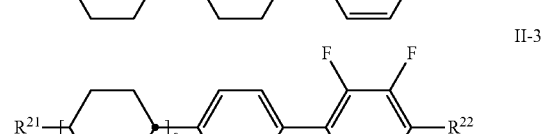

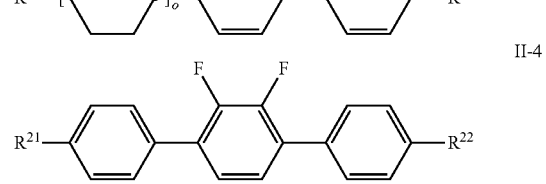

(Continued)

in which the parameters have the meanings defined herein, are suitable for use in an electro-optical display, particularly in an active-matrix display based on the VA, ECB, PALC, FFS or IPS effect.

26 Claims, No Drawings

(56) References Cited

U.S. PATENT DOCUMENTS

| | | |
|---|---|---|
| 2015/0184077 A1 | 7/2015 | Goetz |
| 2016/0264866 A1 | 9/2016 | Hirschmann et al. |

FOREIGN PATENT DOCUMENTS

| | | |
|---|---|---|
| EP | 2722380 A2 | 4/2014 |
| EP | 2722381 A2 | 4/2014 |
| EP | 2514800 B1 | 10/2014 |
| EP | 3067406 A1 | 9/2016 |
| FR | 2405247 A1 | 5/1979 |
| JP | 55-023169 A | 2/1980 |
| JP | 05-117324 A | 5/1993 |
| JP | 09-291282 A | 11/1997 |
| WO | 0218515 A1 | 3/2002 |
| WO | 2008009417 A1 | 1/2008 |
| WO | 2009021671 A1 | 2/2009 |
| WO | 2009115186 A1 | 9/2009 |
| WO | 2009129911 A1 | 10/2009 |
| WO | 2013182271 A1 | 12/2013 |

OTHER PUBLICATIONS

Machine english translation of WO2009115186A1 (published Sep. 24, 2009) to Merck Patent GMBH.
English abstract of DE2126954 published on Dec. 16, 1971 to Konishiroku Photo Industry Co. Ltd. Sankyo Co. Ltd.
Englsih Abstract of JP9291282A published on Nov. 11, 1997 to Sumitomo Chemical Co.
English Abstract of JP5117324A published May 14, 1993 to Mitsubishi Rayon Co.
English translation of FR2405247 published May 4, 1979 to Argus Chem.

LIQUID-CRYSTALLINE MEDIUM

The present invention relates to liquid-crystal media, to the use of these liquid-crystal media in liquid-crystal displays, and to these liquid-crystal displays, particularly liquid-crystal displays which use the ECB (electrically controlled birefringence) effect with dielectrically negative liquid crystals in a homeotropic initial alignment. The liquid-crystal media according to the invention are distinguished by a particularly short response time in the displays according to the invention at the same time as a high voltage holding ratio (VHR or also just HR for short).

The principle of electrically controlled birefringence, the ECB effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta\epsilon$ of $\leq -0.5$ in order to be suitable for use for high-information display elements based on the ECB effect. Electro-optical display elements based on the ECB effect have a homeotropic alignment (VA technology= vertically aligned). Dielectrically negative liquid-crystal media can also be used in displays which use the so-called IPS (in-plane switching) effect (S. H. Lee, S. L. Lee, H. Y. Kim, Appl. Phys. Lett. 1998, 73(20), 2881-2883).

Industrial application of this effect in electro-optical display elements requires LC phases which have to meet a multiplicity of requirements. Particularly important here are chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as LC phases.

Matrix liquid-crystal displays (MLC displays) are known. Non-linear elements which can be used for individual switching of the individual pixels are, for example, active elements (i.e. transistors). The term "active matrix" is then used, where in general use is made of thin-film transistors (TFTs), which are generally arranged on a glass plate as substrate.

A distinction is made between two technologies: TFTs comprising compound semiconductors, such as, for example, CdSe, or TFTs based on polycrystalline and, inter alia, amorphous silicon. The latter technology currently has the greatest commercial importance worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is located opposite each switchable pixel.

The TFT displays most used hitherto usually operate with crossed polarizers in transmission and are backlit. For TV applications, IPS cells or ECB (or VAN) cells are used, whereas monitors usually use IPS cells or TN (twisted nematic) cells, and notebooks, laptops and mobile applications usually use TN cells.

The term MLC displays here encompasses any matrix display having integrated non-linear elements, i.e., besides the active matrix, also displays with passive elements, such as varistors or diodes (MIM=metal-insulator-metal).

MLC displays of this type are particularly suitable for TV applications, monitors and notebooks or for displays with a high information density, for example in automobile manufacture or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

Displays which use the ECB effect have become established as so-called VAN (vertically aligned nematic) displays, besides IPS displays (for example: Yeo, S. D., Paper 15.3: "An LC Display for the TV Application", SID 2004 International Symposium, Digest of Technical Papers, XXXV, Book II, pp. 758 and 759) and the long-known TN displays, as one of the three more recent types of liquid-crystal display that are currently the most important, in particular for television applications.

The most important designs may be mentioned here: MVA (multi-domain vertical alignment, for example: Yoshide, H. et al., Paper 3.1: "MVA LCD for Notebook or Mobile PCs . . . ", SID 2004 International Symposium, Digest of Technical Papers, XXXV, Book I, pp. 6 to 9, and Liu, C. T. et al., Paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book II, pp. 760 to 763) and ASV (advanced super view, for example: Shigeta, Mitzuhiro and Fukuoka, Hirofumi, Paper 15.2: "Development of High Quality LCDTV", SID 2004 International Symposium, Digest of Technical Papers, XXXV, Book II, pp. 754 to 757).

In general form, the technologies are compared, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., Paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular in the switching of grey shades, is still a problem which has not yet been solved to a satisfactory extent.

ECB displays, like ASV displays, use liquid-crystalline media having negative dielectric anisotropy (Δε), whereas TN and to date all conventional IPS displays use liquid-crystalline media having positive dielectric anisotropy.

In liquid-crystal displays of this type, the liquid crystals are used as dielectrics, whose optical properties change reversibly on application of an electrical voltage.

Since in displays in general, i.e., also in displays in accordance with these mentioned effects, the operating voltage should be as low as possible, use is made of liquid-crystal media which are generally predominantly composed of liquid-crystal compounds, all of which have the same sign of the dielectric anisotropy and have the highest possible value of the dielectric anisotropy. In general, at most relatively small proportions of neutral compounds and if possible no compounds having a sign of the dielectric anisotropy which is opposite to that of the medium are employed. In the case of liquid-crystal media having negative dielectric anisotropy for ECB displays, predominantly compounds having negative dielectric anisotropy are thus employed. The liquid-crystal media employed generally consist predominantly and usually even essentially of liquid-crystal compounds having negative dielectric anisotropy.

In the media used in accordance with the present application, at most significant amounts of dielectrically neutral liquid-crystal compounds and generally only very small amounts of dielectrically positive compounds or even none at all are typically employed, since in general the liquid-crystal displays are intended to have the lowest possible addressing voltages.

For many practical applications in liquid-crystal displays, however, the known liquid-crystal media are not sufficiently stable. In particular, their stability to irradiation with UV, but also even with conventional backlighting, results in an impairment, in particular, of the electrical properties. Thus, for example, the conductivity increases significantly.

The use of so-called "hindered amine light stabilizers", HALS for short, has already been proposed for the stabilization of liquid-crystal mixtures.

Nematic liquid-crystal mixtures having negative dielectric anisotropy which comprise a small amount of TINUVIN®770, a compound of the formula

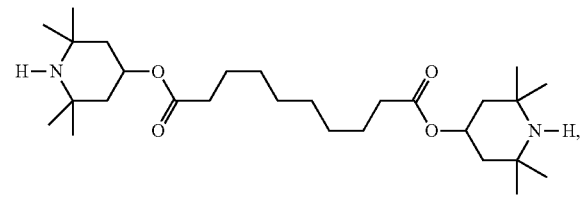

as stabilizer, are proposed, for example, in WO 2009/129911 A1. However, the corresponding liquid-crystal mixtures do not have adequate properties for some practical applications. Inter alia, they are not sufficiently stable to irradiation using typical CCFL (cold cathode fluorescent lamp) backlighting.

Similar liquid-crystal mixtures are also known, for example, from EP 2 182 046 A1, WO 2008/009417 A1, WO 2009/021671 A1 and WO 2009/115186 A1. According to the disclosure therein, these liquid-crystal mixtures may optionally also comprise stabilizers of various types, such as, for example, phenols and sterically hindered amines (hindered amine light stabilizers, HALS for short).

These liquid-crystal mixtures may, to different extents depending on the application, exhibit an impairment of one or more parameters which are relevant during operation of a liquid-crystal display: in particular, their voltage holding ratio drops after exposure. In addition, a yellowish discoloration may occur in the case of extreme exposure.

The use of various stabilizers in liquid-crystalline media is described, for example, in JP (S)55-023169 (A), JP (H)05-117324 (A), WO 02/18515 A1 and JP (H) 09-291282 (A).

TINUVIN®123, a compound of the formula

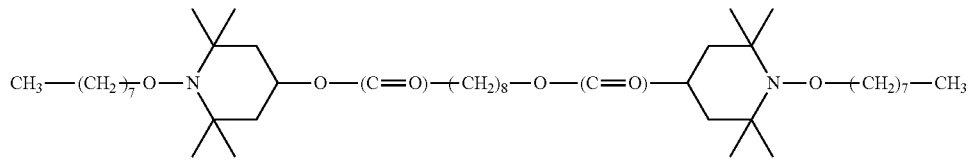

has also been proposed for stabilization purposes.

Mesogenic compounds containing one or two HALS units are disclosed in EP 1 1784 442 A1.

HALS with various substituents on the nitrogen atom are compared with respect to their $pK_B$ values in Ohkatsu, Y., *J. of Japan Petroleum Institute,* 51, 2008, pages 191-204. The following types of structural formulae are disclosed here.

| Type | Active group of the stabilizer |
|---|---|
| "HALS" | RO—⟨⟩—N—H |
| "R-HALS" or "NR-HALS" | RO—⟨⟩—N—R |
| "NOR-HALS" | RO—⟨⟩—N—OR |

The compound TEMPOL, of the following formula:

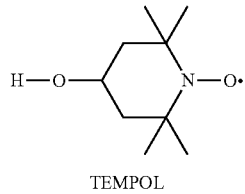

TEMPOL is known; it is mentioned, for example, in Miéville, P. et al., Angew. Chem. 2010, 122, pages 6318-6321. It is commercially available from various manufacturers and is employed, for example, as polymerization inhibitor and, in particular in combination with UV absorbers, as light or UV protection in formulations for precursors of polyolefins, polystyrenes, polyamides, coatings and PVC.

Furthermore, the prior art discloses compounds containing three or four reactive groups for use in liquid-crystal mixtures, such as, for example, the compounds of the formula

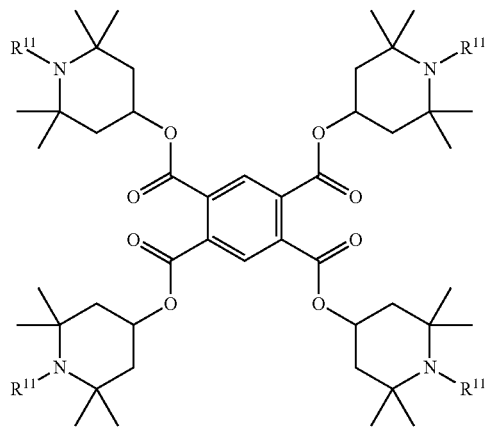

in which $R^{11}$ denotes, inter alia, —O•,
which are disclosed in EP 2514800 B1 and WO 2013/182271 A1.

In addition, DE 2126954 A1 discloses a compound of the formula

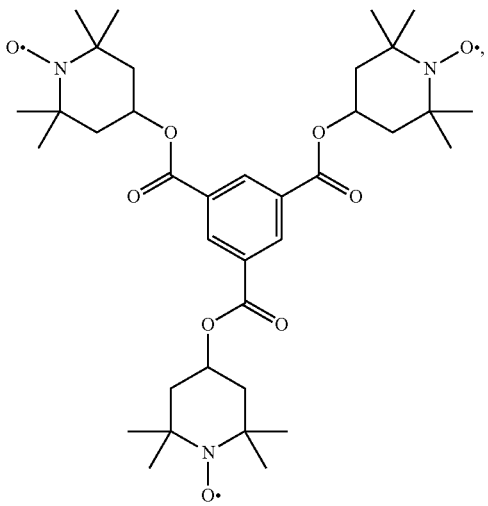

which is suitable as dye stabilizer.

EP 2514800 B1, which has already been cited, likewise discloses an aliphatic tri-reactive compound of the following formula for use in liquid crystals:

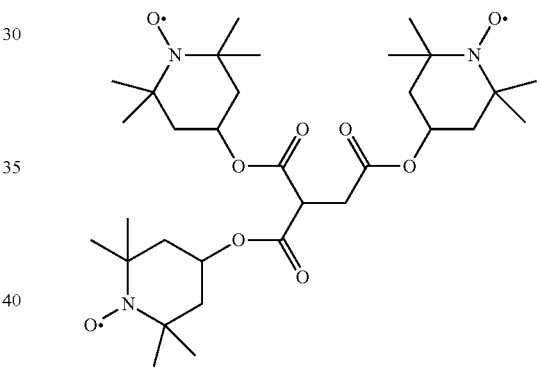

FR 2405247 describes aliphatic tetracarboxylic acids of the following formulae which are structurally related to this compound, as stabilizers for polymers:

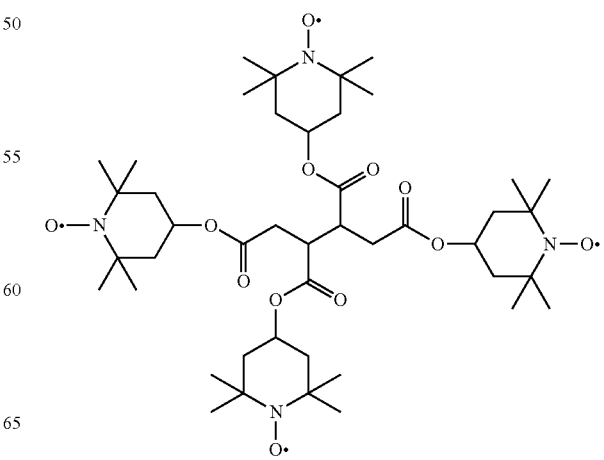

-continued

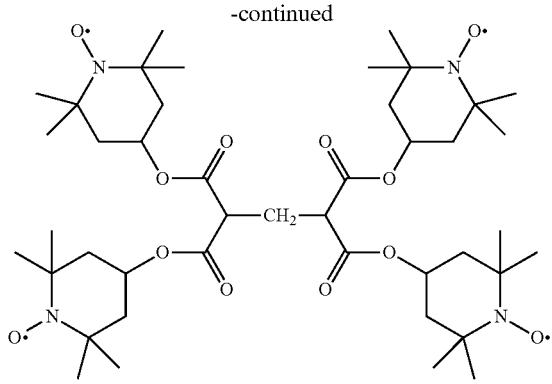

The prior-art liquid-crystal media having correspondingly low addressing voltages have relatively low electrical resistance values or a VHR which is still inadequate as it is too low and often result in undesired flicker and/or inadequate transmission in the displays. In addition, they are not sufficiently stable to heating and/or UV exposure, at least if they have correspondingly high polarity, as is necessary for low addressing voltages.

On the other hand, the addressing voltage of the displays of the prior art which have a high VHR is often too high, in particular for displays which are not connected directly or not continuously to the power supply network, such as, for example, displays for mobile applications.

In addition, the phase range of the liquid-crystal mixture must be sufficiently broad for the intended application of the display.

The response times of the liquid-crystal media in the displays must be improved, i.e. reduced. This is particularly important for displays for television or multimedia applications. In order to improve the response times, it has repeatedly been proposed in the past to optimize the rotational viscosity of the liquid-crystal media ($\gamma_1$), i.e. to achieve media having the lowest possible rotational viscosity. However, the results achieved here are inadequate for many applications and therefore make it appear desirable to find further optimization approaches.

Adequate stability of the media to extreme loads, in particular to UV exposure and heating, is very particularly important. In particular in the case of applications in displays in mobile equipment, such as, for example, mobile telephones, this may be crucial.

The disadvantage of the MLC displays disclosed hitherto is due to their comparatively low contrast, the relatively high viewing-angle dependence and the difficulty in producing grey shades in these displays, as well as their inadequate VHR and their inadequate lifetime.

There thus continues to be a great demand for MLC displays having very high specific resistance at the same time as a large working-temperature range, short response times and a low threshold voltage, with the aid of which various grey levels can be produced and which have, in particular, a good and stable VHR.

The invention has the object of providing MLC displays, not only for monitor and TV applications, but also for mobile telephones and navigation systems, which are based on the ECB effect or on the IPS or FFS effect, do not have the disadvantages indicated above, or only do so to a lesser extent, and at the same time have very high specific resistance values. In particular, it must be ensured for mobile telephones and navigation systems that they also work at extremely high and extremely low temperatures.

Surprisingly, it has been found that it is possible to achieve liquid-crystal displays which have, in particular in ECB displays, a low threshold voltage with short response times and at the same time a sufficiently broad nematic phase, favorable, relatively low birefringence ($\Delta n$), good stability to decomposition by heating and by UV exposure, and a stable, high VHR if use is made in these display elements of nematic liquid-crystal mixtures which comprise at least one compound of the formula I and at least one compound selected from the group of the compounds of the formulae II-1 to II-4, preferably of the formula II-3, and/or at least one compound of the formulae IV and/or V and optionally a compound of the formula III, preferably of the formula III-3.

Media of this type can be used, in particular, for electro-optical displays having active-matrix addressing based on the ECB effect and for IPS (in-plane switching) displays.

The invention thus relates to a liquid-crystalline medium based on a mixture of polar compounds which comprises at least one compound of the formula I and one or more compounds selected from the group of the compounds of the formulae II-1 to II-4 and/or additionally one or more compounds of the formulae IV and/or V.

The mixtures according to the invention exhibit very broad nematic phase ranges with clearing points ≥70° C., very favorable values for the capacitive threshold, relatively high values for the holding ratio and at the same time good low-temperature stabilities at −20° C. and −30° C., as well as very low rotational viscosities. The mixtures according to the invention are furthermore distinguished by a good ratio of clearing point and rotational viscosity and by a high negative dielectric anisotropy.

Surprisingly, it has now been found that it is possible to achieve liquid-crystalline media having a suitably high $\Delta\epsilon$, a suitable phase range and $\Delta n$ which do not have the disadvantages of the prior-art materials, or at least only do so to a considerably reduced extent. Surprisingly, it has been found here that the compounds of the formula I, even when used alone without additional heat stabilizers, result in considerable, in many cases adequate, stabilization of liquid-crystal mixtures both to UV exposure and also to heating.

However, adequate stabilization of liquid-crystal mixtures both against UV exposure and against heating can also be achieved, in particular, if one or more further compounds, preferably phenolic stabilizers, are present in the liquid-crystal mixture in addition to the compound of the formula I, or the compounds of the formula I. These further compounds are suitable as heat stabilizers.

The invention thus relates to compounds of the formula I, and to a liquid-crystalline medium having a nematic phase and negative dielectric anisotropy which comprises
a) one or more compounds of the formula I, preferably in a concentration in the range from 1 ppm to 1000 ppm, preferably in the range from 1 ppm to 500 ppm, particularly preferably in the range from 1 ppm to 250 ppm,

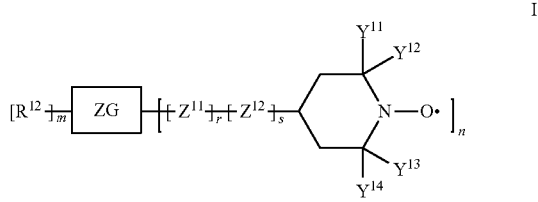

in which n denotes 3 or 4, m denotes (4−n),

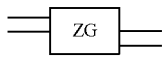

denotes an organic radical having 4 bonding sites, preferably an alkanetetrayl unit having 1 to 20 C atoms, in which, in addition to the m groups $R^{12}$ present in the molecule, but independently thereof, a further H atom may be replaced by $R^{12}$ or a plurality of further H atoms may each be replaced by $R^{12}$ and in which one —$CH_2$— group or a plurality of —$CH_2$— groups may each be replaced by —O— or —(C=O)— in such a way that two O atoms are not bonded directly to one another, or denotes a substituted or unsubstituted aromatic or heteroaromatic hydrocarbon radical having 4 bonding sites, in which, in addition to the m groups $R^{12}$ present in the molecule, but independently thereof, a further H atom may be replaced by $R^{12}$ or a plurality of further H atoms may each be replaced by $R^{12}$, $Z^{11}$ and $Z^{12}$, independently of one another, denote —O—, —(C=O)—, —(N—$R^{14}$)— or a single bond, but do not both simultaneously denote —O—, r and s, independently of one another, denote 0 or 1, $Y^{11}$ to $Y^{14}$ each, independently of one another, denote alkyl having 1 to 4 C atoms, preferably methyl or ethyl, particularly preferably all denote either methyl or ethyl and very particularly preferably methyl, and alternatively, independently of one another, one or both of the pairs ($Y^{11}$ and $Y^{12}$) and ($Y^{13}$ and $Y^{14}$) together also denote a divalent group having 3 to 6 C atoms, preferably having 5 C atoms, particularly preferably 1,5-pentylene, $R^{12}$ on each occurrence, independently of one another, denotes H, F, $OR^{14}$, $NR^{14}R^{15}$, a straight-chain or branched alkyl chain having 1-20 C atoms, in which one —$CH_2$— group or a plurality of —$CH_2$— groups may each be replaced by —O— or —C(=O)—, but two adjacent —$CH_2$— groups cannot be replaced by —O—, denotes a hydrocarbon radical which contains a cycloalkyl or alkylcycloalkyl unit and in which one —$CH_2$— group or a plurality of —$CH_2$— groups may each be replaced by —O— or —C(=O)—, but two adjacent —$CH_2$— groups cannot be replaced by —O—, and in which one H atom or a plurality of H atoms may each be replaced by $OR^{14}$, $N(R^{14})(R^{15})$ or $R^{16}$, or denotes an aromatic or heteroaromatic hydrocarbon radical, in which one H atom or a plurality of H atoms may each be replaced by $OR^{14}$, $N(R^{14})(R^{15})$ or $R^{16}$, $R^{14}$ on each occurrence, independently of one another, denotes a straight-chain or branched alkyl or acyl group having 1 to 10 C atoms, preferably n-alkyl, or an aromatic hydrocarbon or carboxyl radical having 6-12 C atoms, preferably with the proviso that, in the case of $N(R^{14})(R^{15})$, at least one acyl radical is present, $R^{15}$ on each occurrence, independently of one another, denotes a straight-chain or branched alkyl or acyl group having 1 to 10 C atoms, preferably n-alkyl, or an aromatic hydrocarbon or carboxyl radical having 6-12 C atoms, preferably with the proviso that, in the case of $N(R^{14})(R^{15})$, at least one acyl radical is present, $R^{16}$ on each occurrence, independently of one another, denotes a straight-chain or branched alkyl group having 1 to 10 C atoms, in which one —$CH_2$— group or a plurality of —$CH_2$— groups may each be replaced by —O— or —C(=O)—, but two adjacent —$CH_2$— groups cannot be replaced by —O—, b) one or more compounds selected from the group of the compounds of the formulae II-1 to II-4, preferably of the formula II-3,

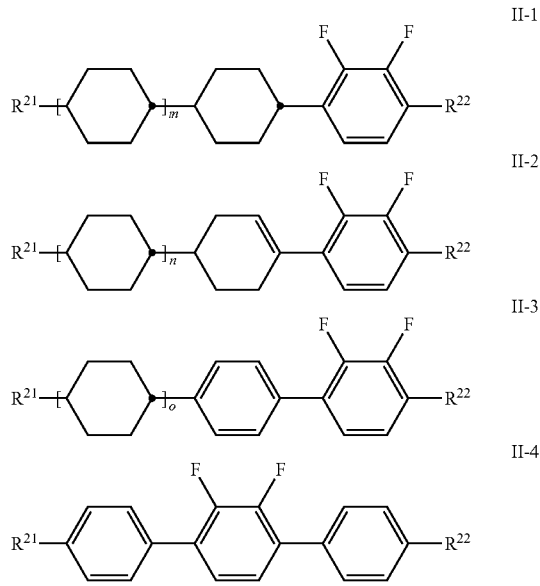

in which $R^{21}$ denotes an unsubstituted alkyl radical having 1 to 7 C atoms, preferably an n-alkyl radical, particularly preferably having 2 to 5 C atoms, or an unsubstituted alkenyl radical having 2 to 7 C atoms, preferably a straight-chain alkenyl radical, particularly preferably having 2 to 5 C atoms, $R^{22}$ denotes an unsubstituted alkyl radical having 1 to 7 C atoms, preferably having 2 to 5 C atoms, or an unsubstituted alkoxy radical having 1 to 6 C atoms, preferably having 2, 3 or 4 C atoms, and m, n and o each, independently of one another, denote 0 or 1, c) optionally one or more compounds of the formula III,

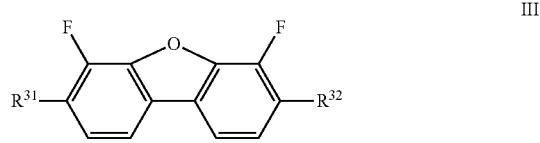

in which $R^{31}$, $R^{32}$, independently of one another, denote an unsubstituted alkyl radical having 1 to 7 C atoms, preferably an n-alkyl radical, particularly preferably having 2 to 5 C atoms, or an unsubstituted alkoxy radical having 2 to 7 C atoms, particularly preferably having 2 to 5 C atoms, where preferably at least one of the radicals $R^{31}$ and $R^{32}$ denotes alkoxy, and d) optionally, preferably obligatorily, one or more compounds selected from the group of the compounds of the formulae IV and V, preferably of the formula IV,

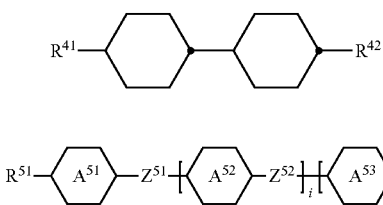 IV

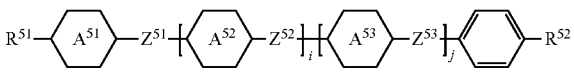 V in which

R⁴¹ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and R⁴² denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical, R⁵¹ and R⁵², independently of one another, denote unsubstituted alkyl having 1 to 7 C atoms, preferably n-alkyl, particularly preferably n-alkyl having 1 to 5 C atoms, alkoxy having 1 to 6 C atoms, preferably n-alkoxy, particularly preferably n-alkoxy having 2 to 5 C atoms, unsubstituted alkenyl having 2 to 7 C atoms, preferably a straight-chain alkenyl radical, particularly preferably alkenyl having 2 to 5 C atoms, or alkoxyalkyl, alkenyl or alkenyloxy having 2 to 7 C atoms, preferably having 2 to 4 C atoms, preferably alkenyloxy,

to

if present, each, independently of one another, denote

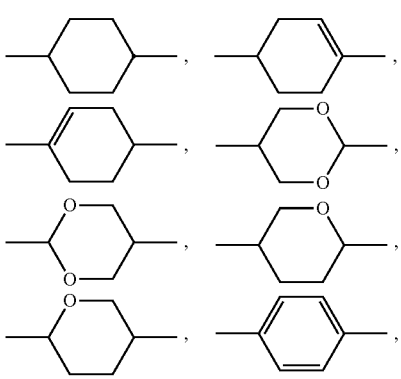

-continued

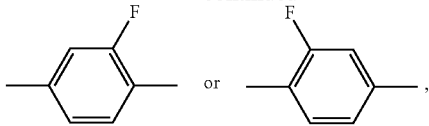

preferably

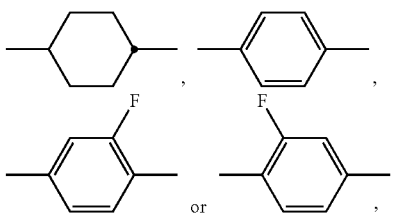

preferably

denotes

and, if present,

preferably denotes

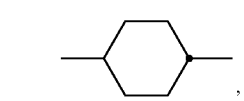

Z⁵¹ to Z⁵³ each, independently of one another, denote —CH₂—CH₂—, —CH₂—O—, —CH═CH—, —C≡C—, —COO— or a single bond, preferably —CH₂—CH₂—, —CH₂—O— or a single bond and particularly preferably a single bond, i and j each, independently of one another, denote 0 or 1, (i+j) preferably denotes 0 or 1.

The following embodiments are preferred:

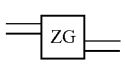

denotes

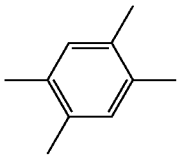

(benzene-1,2,4,5-tetrayl) or straight-chain or branched tetravalent alkyl having 2 to 24 C atoms,

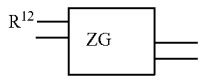

denotes

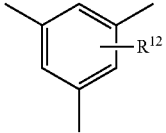

(benzene-1,2,4,5-triyl) or straight-chain or branched trivalent alkyl having 2 to 24 C atoms which is substituted by $R^{12}$, $-[Z^{11}-]_r-[Z^{12}-]_s$ is on each occurrence, independently of one another, denotes —O—, —(C=O)—O— or —O—(C=O)—, —(N—$R^{14}$)— or a single bond, preferably —O— or —(C=O)—O— or —O—(C=O)—, and $R^{12}$, if present, denotes alkyl or alkoxy.

In the present application, "trivalent alkyl" denotes an alkyl group which may carry further substituents at three positions. Likewise, "tetravalent alkyl" denotes an alkyl group which may carry further substituents at four further positions.

In the present application, the elements all include their respective isotopes. In particular, one or more H in the compounds may each be replaced by D, and this is also particularly preferred in some embodiments. A correspondingly high degree of deuteration of the corresponding compounds enables, for example, detection and recognition of the compounds. This is very helpful in some cases, in particular in the case of the compounds of the formula I.

In the present application, alkyl particularly preferably denotes straight-chain alkyl, in particular $CH_3$—, $C_2H_5$—, n-$C_3H_7$—, n-$C_4H_9$— or n-$C_5H_{11}$—;

alkenyl particularly preferably denotes $CH_2$=CH—, E-$CH_3$—CH=CH—, $CH_2$=CH—$CH_2$—$CH_2$—, E-$CH_3$—CH=CH—$CH_2$—$CH_2$— or E-(n-$C_3H_7$)—CH=CH—; and/or alkoxy particularly preferably denotes straight-chain alkoxy, in particular $CH_3O$—, $C_2H_5O$—, n-$C_3H_7O$—, n-$C_4H_9O$— or n-$C_5H_{11}O$—.

The liquid-crystalline media in accordance with the present application preferably comprise in total 1 ppm to 1000 ppm, preferably 1 ppm to 500 ppm, even more preferably 1 to 250 ppm, preferably to 200 ppm and very particularly preferably 1 ppm to 100 ppm, of compounds of the formula I.

The concentration of the compounds of the formula I in the media according to the invention is preferably 90 ppm or less, particularly preferably 50 ppm or less. The concentration of the compounds of the formula I in the media according to the invention is very particularly preferably 10 ppm or more to 80 ppm or less.

In a particularly preferred embodiment of the present invention, in the compounds of the formula I,

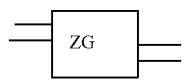

denotes

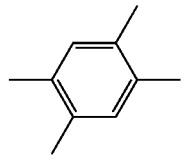

(benzene-1,2,4,5-tetrayl) or straight-chain or branched tetravalent alkyl having 2 to 12 C atoms or

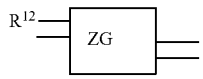

denotes

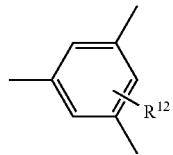

or straight-chain or branched trivalent alkyl having 2 to 12 C atoms which is substituted by $R^{12}$, $-[Z^{11}-]_r-[Z^{12}-]_s$ on each occurrence, independently of one another, denotes —O—, —(C=O)—O— or —O—(C=O)—, and $R^{12}$ denotes H.

In a preferred embodiment of the present invention, the group

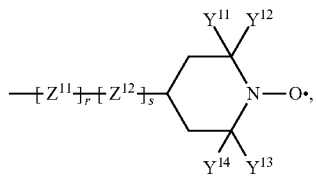

in the compounds of the formula I on each occurrence denotes

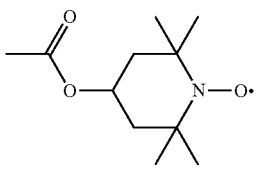

These compounds are eminently suitable as stabilizers in liquid-crystal mixtures. In particular, they stabilize the VHR of the mixtures against UV exposure.

In a preferred embodiment of the present invention, the media according to the invention in each case comprise one or more compounds of the formula I selected from the group of the compounds of the formulae I-1 and I-2,

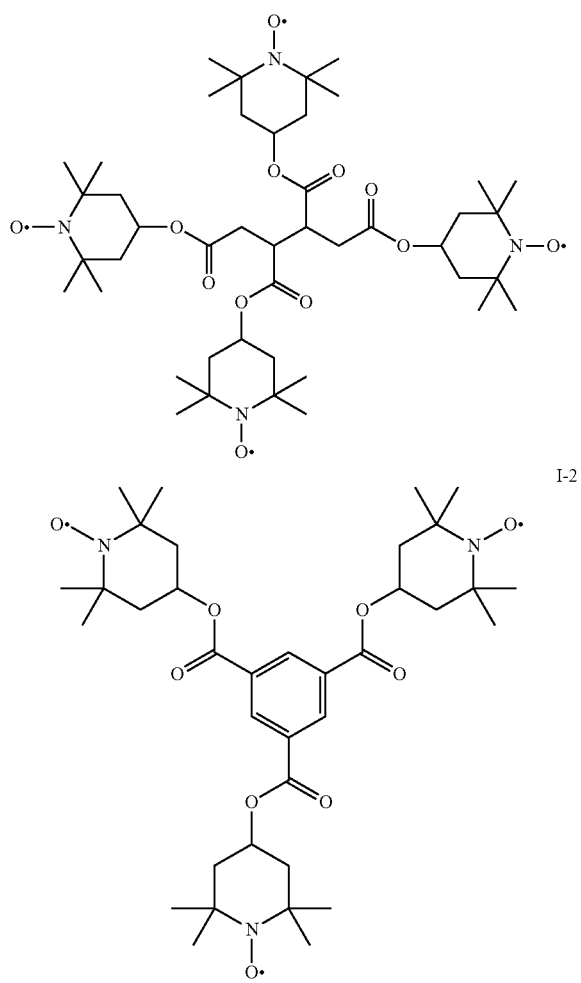

The medium according to the invention preferably comprises one or more compounds selected from the group of the formulae II-1 to II-4 in a total concentration in the range from 10% or more to 80% or less, preferably from 15% or more to 70% or less, particularly preferably from 20% or more to 60% or less.

In a further preferred embodiment, the medium according to the invention, in addition to the compounds selected from the group of the formulae II-1 to II-4, comprises one or more compounds of the formula III-3 in a total concentration in the range from 1% or more to 20% or less, preferably from 2% or more to 15% or less, particularly preferably from 3% or more to 10% or less.

The media in accordance with the present invention, in addition to the compounds of the formula I, or preferred sub-formulae thereof, preferably comprise one or more dielectrically neutral compounds of the formulae IV and V in a total concentration in the range from 5% or more to 90% or less, preferably from 10% or more to 80% or less, particularly preferably from 20% or more to 70% or less.

The medium according to the invention especially preferably comprises one or more compounds of the formula II-1 in a total concentration in the range from 5% or more to 30% or less, and/or one or more compounds of the formula II-2 in a total concentration in the range from 3% or more to 30% or less, and/or one or more compounds of the formula II-3 in a total concentration in the range from 5% or more to 30% or less, and/or one or more compounds of the formula II-4 in a total concentration in the range from 1% or more to 30% or less.

In a preferred embodiment of the present invention, the media according to the invention comprise one or more compounds of the formula II-1, preferably one or more compounds selected from the group of the compounds of the formulae II-1-1 and II-1-2,

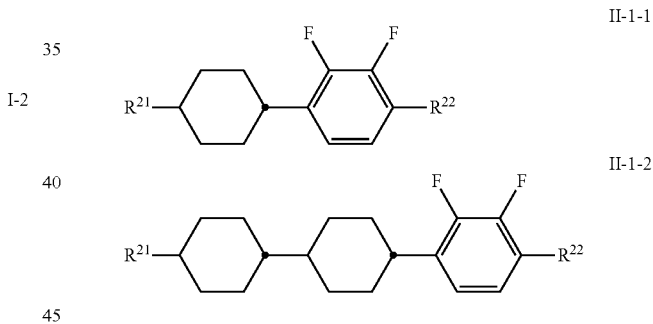

in which the parameters have the meaning given above in the case of formula II-1 and preferably $R^{21}$ denotes an alkyl radical having 2 to 5 C atoms, preferably having 3 to 5 C atoms, and $R^{22}$ denotes an alkyl or alkoxy radical having 2 to 5 C atoms, preferably an alkoxy radical having 2 to 4 C atoms, or an alkenyloxy radical having 2 to 4 C atoms.

In a preferred embodiment of the present invention, the media according to the invention comprise one or more compounds of the formula II-2, preferably one or more compounds selected from the group of the compounds of the formulae II-2-1 and II-2-2,

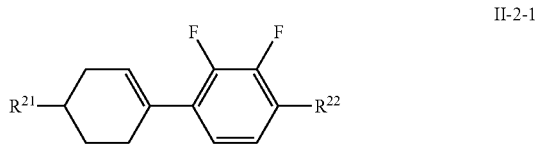

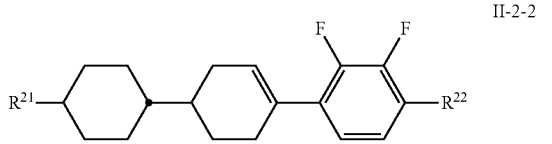

II-2-2 in which the parameters have the meaning given above in the case of formula II-2 and preferably $R^{21}$ denotes an alkyl radical having 2 to 5 C atoms, preferably having 3 to 5 C atoms, and $R^{22}$ denotes an alkyl or alkoxy radical having 2 to 5 C atoms, preferably an alkoxy radical having 2 to 4 C atoms, or an alkenyloxy radical having 2 to 4 C atoms.

In a particularly preferred embodiment of the present invention, the media according to the invention comprise one or more compounds of the formula II-3, preferably one or more compounds selected from the group of the compounds of the formulae II-3-1 and II-3-2, very particularly preferably of the formula II-3-2,

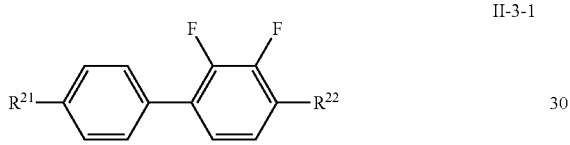

II-3-1

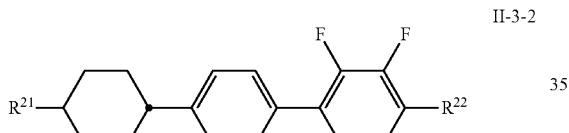

II-3-2 in which the parameters have the meaning given above in the case of formula II-3 and preferably $R^{21}$ denotes an alkyl radical having 2 to 5 C atoms, preferably having 3 to 5 C atoms, and $R^{22}$ denotes an alkyl or alkoxy radical having 2 to 5 C atoms, preferably an alkoxy radical having 2 to 4 C atoms, or an alkenyloxy radical having 2 to 4 C atoms.

In a further preferred embodiment, the medium comprises one or more compounds of the formula II-4, preferably of the formula II-4-a,

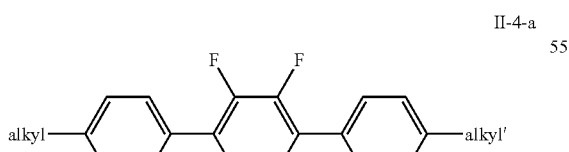

II-4-a in which alkyl and alkyl', independently of one another, denote alkyl having 1 to 7 C atoms, preferably having 2 to 5 C atoms.

In a further preferred embodiment, the medium comprises one or more compounds of the formulae III-1 to III-3,

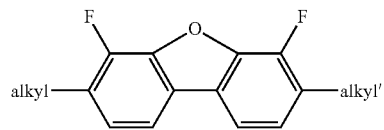

III-1

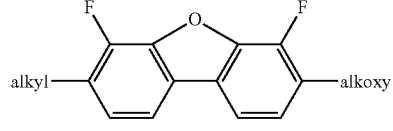

III-2

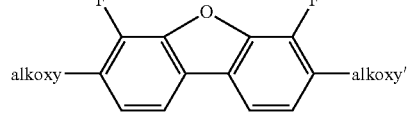

III-3 in which alkyl, alkyl' denote alkyl having 1 to 7 C atoms, preferably having 2-5 C atoms, alkoxy, alkoxy' denote alkoxy having 1 to 7 C atoms, preferably having 2 to 5 C atoms.

The medium particularly preferably comprises one or more compounds of the formula III-3.

In a further preferred embodiment, the medium comprises one or more compounds of the formula IV,

IV in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

In a particularly preferred embodiment, the medium comprises one or more compounds of the formula IV, selected from the group of the compounds of the formulae IV-1 to IV-4, preferably selected from the group of the compounds of the formulae IV-1 and IV-2,

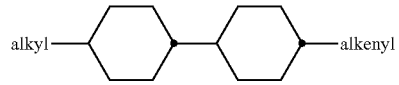

IV-1

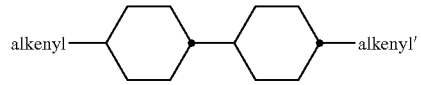

IV-2

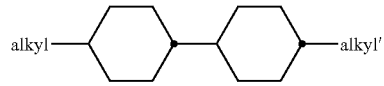

IV-3

-continued

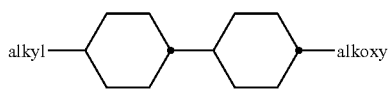
IV-4 in which
alkyl and alkyl', independently of one another, denote alkyl having 1 to 7 C atoms, preferably having 2 to 5 C atoms,
alkenyl denotes an alkenyl radical having 2 to 5 C atoms, preferably having 2 to 4 C atoms, particularly preferably 2 C atoms,
alkenyl' denotes an alkenyl radical having 2 to 5 C atoms, preferably having 2 to 4 C atoms, particularly preferably having 2 to 3 C atoms, and
alkoxy denotes alkoxy having 1 to 5 C atoms, preferably having 2 to 4 C atoms.

In a particularly preferred embodiment, the media according to the invention comprise one or more compounds of the formula IV-1 and/or one or more compounds of the formula IV-2.

In a further preferred embodiment, the medium comprises one or more compounds of the formula V,

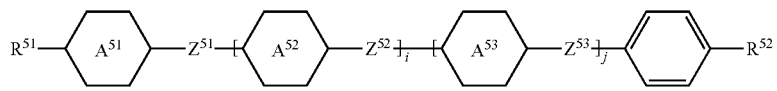
V which
$R^{51}$ and $R^{52}$, independently of one another, denote unsubstituted alkyl having 1 to 7 C atoms, preferably n-alkyl, particularly preferably n-alkyl having 1 to 5 C atoms, alkoxy having 1 to 6 C atoms, preferably n-alkoxy, particularly preferably n-alkoxy having 2 to 5 C atoms, unsubstituted alkenyl having 2 to 7 C atoms, preferably a straight-chain alkenyl radical, particularly preferably alkenyl having 2 to 5 C atoms, or alkoxyalkyl, alkenyl or alkenyloxy having 2 to 7 C atoms, preferably having 2 to 4 C atoms, preferably alkenyloxy,

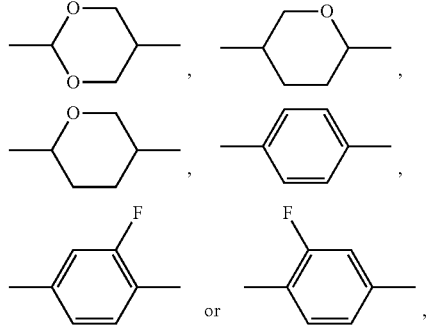

preferably

-continued

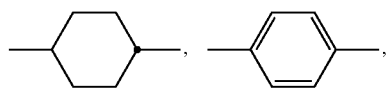

preferably to if present, each, independently of one another, denote denotes and, if present, preferably denotes

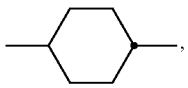

$Z^{51}$ to $Z^{53}$ each, independently of one another, denote —CH$_2$—CH$_2$—, —CH$_2$—O—, —CH═CH—, —C≡C—, —COO— or a single bond, preferably —CH$_2$—CH$_2$—, —CH$_2$—O— or a single bond and particularly preferably a single bond, i and j each, independently of one another, denote 0 or 1, (i+j) preferably denotes 0 or 1.

The media according to the invention preferably comprise the following compounds in the total concentrations indicated:

10-60% by weight of one or more compounds selected from the group of the compounds of the formulae II-1 to II-4 and/or 10-60% by weight of one or more compounds of the formulae IV and/or V, where the total content of all compounds in the medium is 100%.

In a particularly preferred embodiment, the media according to the invention comprise one or more compounds selected from the group of the compounds of the formulae OH-1 to OH-6,

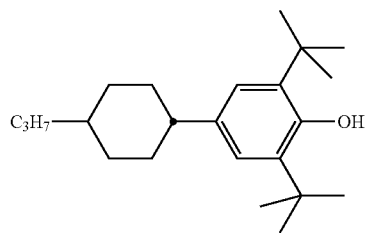

OH-1

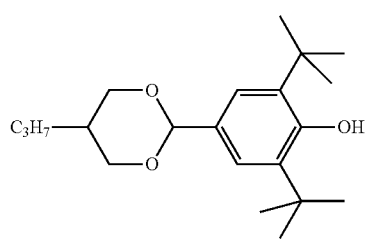

OH-2

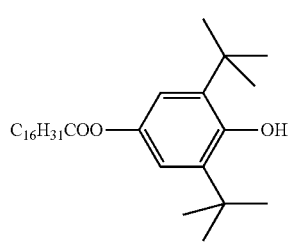

OH-3

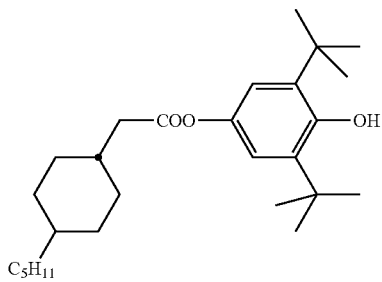

OH-4

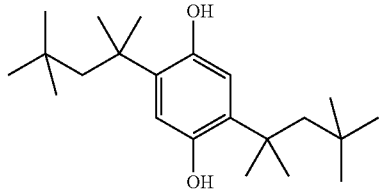

OH-5

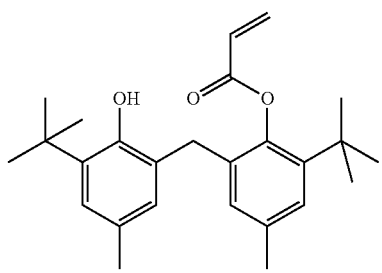

OH-6

These compounds are highly suitable for the stabilization of the media against heating.

In another preferred embodiment of the present invention, the media according to the invention may also have adequate stability if they do not comprise a phenol compound, in particular selected from the group of the compounds of the formulae OH-1 to OH-6.

The present invention also relates to electro-optical displays or electro-optical components which contain liquid-crystalline media according to the invention. Preference is given to electro-optical displays which are based on the VA or ECB effect and in particular those which are addressed by means of an active-matrix addressing device.

Accordingly, the present invention likewise relates to the use of a liquid-crystalline medium according to the invention in an electro-optical display or in an electro-optical component, and to a process for the preparation of the liquid-crystalline media according to the invention, characterized in that one or more compounds of the formula I are mixed with one or more compounds of the formula II-1 and/or II-2 and/or II-3 and/or II-4, preferably with two or more, particularly preferably with three or more, and very particularly preferably with compounds selected from all four of these formulae II-1, II-2, II-3 and II-4, and preferably with one or more further compounds, preferably selected from the group of the compounds of the formulae IV and/or V, and optionally with one or more compounds of formula III.

In a further preferred embodiment, the medium comprises one or more compounds of the formula IV, selected from the group of the compounds of the formulae IV-3 and IV-4,

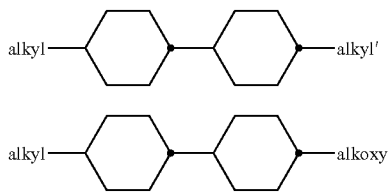

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms.

In a further preferred embodiment, the medium comprises one or more compounds of the formula V selected from the group of the compounds of the formulae V-1 to V-10, preferably selected from the group of the compounds of the formulae V-1 to V-5,

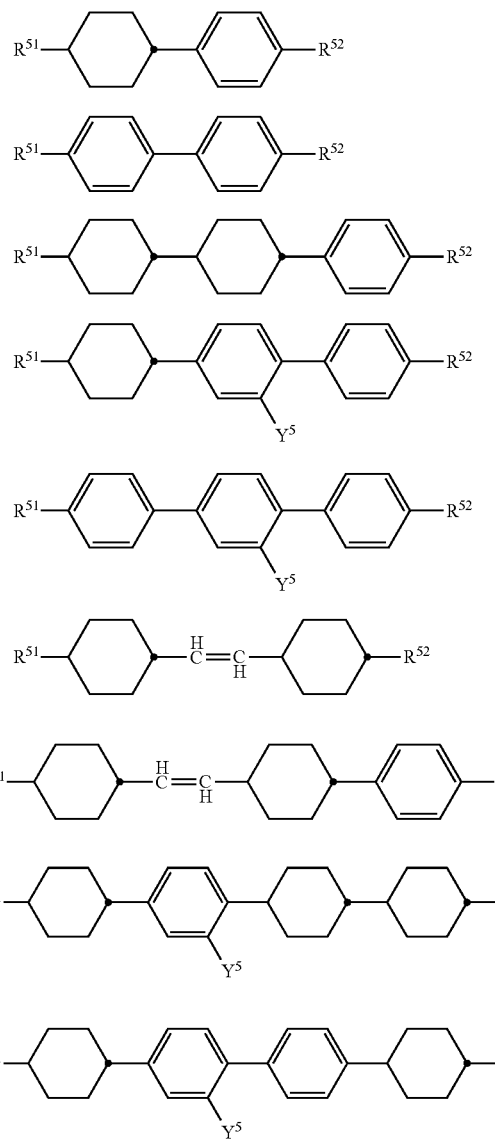

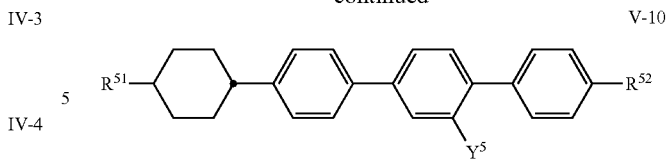

in which the parameters have the meanings given above under formula V, and $Y^5$ denotes H or F, and preferably $R^{51}$ denotes alkyl having 1 to 7 C atoms or alkenyl having 2 to 7 C atoms, and $R^{52}$ denotes alkyl having 1 to 7 C atoms, alkenyl having 2 to 7 C atoms or alkoxy having 1 to 6 C atoms, preferably alkyl or alkenyl, particularly preferably alkenyl.

In a further preferred embodiment, the medium comprises one or more compounds of the formula V-1 selected from the group of the compounds of the formulae V-1a and V-1b, preferably of the formula V-1b,

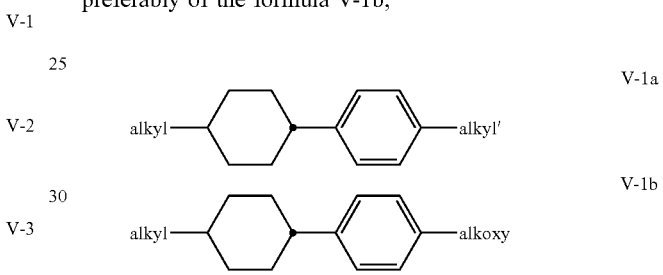

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms.

In a further preferred embodiment, the medium comprises one or more compounds of the formula V-3 selected from the group of the compounds of the formulae V-3a and V-3b,

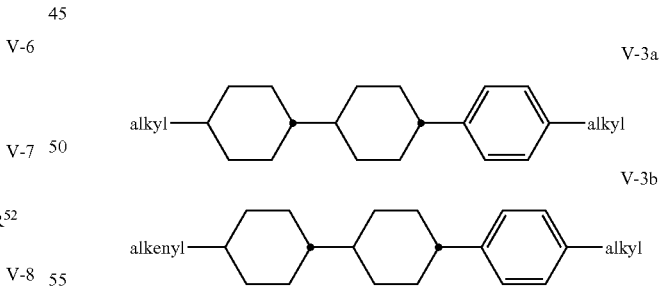

in which
alkyl and alkyl', independently of one another, denote alkyl having 1 to 7 C atoms, preferably having 2 to 5 C atoms, and
alkenyl denotes alkenyl having 2 to 7 C atoms, preferably having 2 to 5 C atoms.

In a further preferred embodiment, the medium comprises one or more compounds of the formula V-4 selected from the group of the compounds of the formulae V-4a and V-4b,

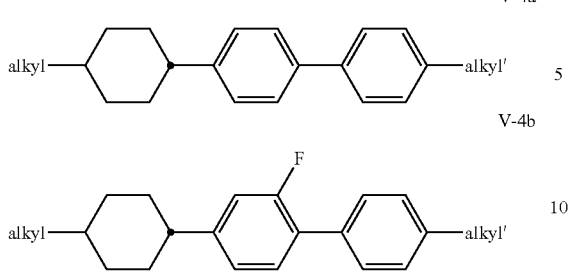

V-4a

V-4b in which
alkyl and alkyl', independently of one another, denote alkyl having 1 to 7 C atoms, preferably having 2 to 5 C atoms.

In addition, the present invention relates to a process for the stabilization of a liquid-crystalline medium which comprises one or more compounds selected from the group of the compounds of the formulae II-1 to II-4 and/or one or more compounds of the formula IV and/or one or more compounds of the formula V, characterized in that one or more compounds of the formula I are added to the medium.

The liquid-crystalline media according to the resent invention may comprise one or more chiral compounds.

In a particularly preferred embodiment of the present invention, the liquid-crystalline media comprise one or more compounds of the formula

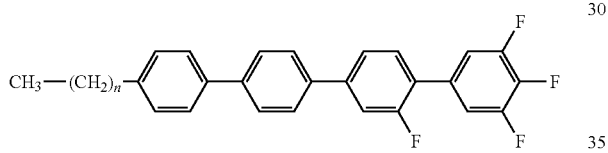

in which n denotes 0, 1, 2, 3, 4, 5 or 6, preferably 2 or 4, particularly preferably 2, preferably in a concentration of 0.1 to 5%, particularly preferably of 0.2 to 1%.

Particularly preferred embodiments of the present invention meet one or more of the following conditions, where the acronyms (abbreviations) are explained in Tables A to C and illustrated by examples in Table D.

i. The liquid-crystalline medium has a birefringence of 0.060 or more, particularly preferably 0.070 or more.
ii. The liquid-crystalline medium has a birefringence of 0.130 or less, particularly preferably 0.120 or less.
iii. The liquid-crystalline medium has a birefringence in the range from 0.090 or more to 0.120 or less.
iv. The liquid-crystalline medium has a negative dielectric anisotropy having an absolute value of 2.0 or more, particularly preferably 2.5 or more.
v. The liquid-crystalline medium has a negative dielectric anisotropy having an absolute value of 5.5 or less, particularly preferably 5.0 or less.
vi. The liquid-crystalline medium has a negative dielectric anisotropy having an absolute value in the range from 3.0 or more to 4.5 or less.
vii. The liquid-crystalline medium comprises one or more particularly preferred compounds of the formula IV selected from the sub-formulae given below:

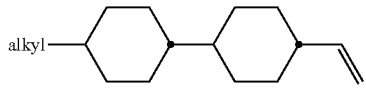

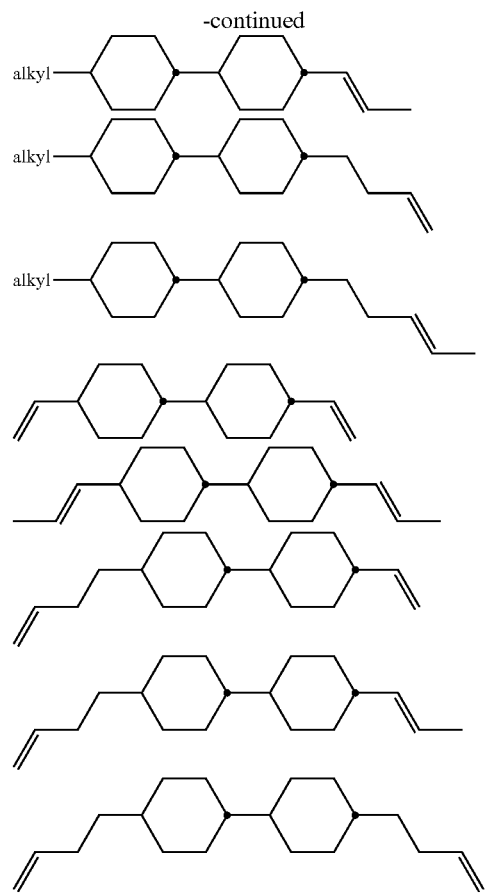

in which alkyl has the meaning given above and preferably, in each case independently of one another, denotes alkyl having 1 to 6, preferably having 2 to 5, C atoms and particularly preferably n-alkyl.

viii. The total concentration of the compounds of the formula IV in the mixture as a whole is 20% or more, preferably 30% or more, and is preferably in the range from 20% or more to 49% or less, particularly preferably in the range from 29% or more to 47% or less, and very particularly preferably in the range from 37% or more to 44% or less.

ix. The liquid-crystalline medium comprises one or more compounds of the formula IV selected from the group of the compounds of the following formulae: CC-n-V and/or CC-n-Vm, particularly preferably CC-3-V, preferably in a concentration of up to 50% or less, particularly preferably up to 42% or less, and optionally additionally CC-3-V1, preferably in a concentration of up to 15% or less, and/or CC-4-V, preferably in a concentration of up to 20% or less, particularly preferably up to 10% or less.

x. The total concentration of the compounds III in the mixture as a whole is in the range from 1% or more to 20% or less, preferably from 2% or more to 15% or less, particularly preferably from 3% or more to 10% or less.

xi. The total concentration of the compounds of the formula CC-3-V in the mixture as a whole is 18% or more, preferably 25% or more.

xii. The proportion of compounds of the formulae II-1 to II-4 and III in the mixture as a whole is 50% or more and preferably 75% or less.

xiii. The liquid-crystalline medium essentially consists of compounds of the formulae I, II-1 to II-4, III, IV and V, preferably of compounds of the formulae I, II-1 to II-4 and IV.

xiv. The liquid-crystalline medium comprises one or more compounds of the formula IV, preferably of the formulae IV-1 and/or IV-2, preferably in a total concentration of 20% or more, in particular of 25% or more, and very particularly preferably of 30% or more to 45% or less.

The invention furthermore relates to an electro-optical display having active-matrix addressing based on the VA or ECB effect, characterized in that it contains, as dielectric, a liquid-crystalline medium in accordance with the present invention.

The invention furthermore relates to an electro-optical display having active-matrix addressing based on the IPS or FFS effect, characterized in that it contains, as dielectric, a liquid-crystalline medium according to the present invention.

The liquid-crystal mixture preferably has a nematic phase range having a width of at least 80 K and a flow viscosity $v_{20}$ of at most 30 mm$^2$·s$^{-1}$ at 20° C.

The liquid-crystal mixture according to the invention has a $\Delta\in$ of −0.5 to −8.0, in particular −1.5 to −6.0, and very particularly preferably −2.0 to −5.0, where $\Delta\in$ denotes the dielectric anisotropy.

The rotational viscosity $\gamma_1$ is preferably 200 mPa·s or less, in particular 150 mPa·s or less, particularly preferably 120 mPa·s or less.

The mixtures according to the invention are suitable for all VA-TFT applications (vertically aligned thin film transistor), such as, for example, VAN, MVA, (S)-PVA (super patterned vertical alignment) and ASV. They are furthermore suitable for IPS (in-plane switching), FFS (fringe-field switching) and PALC (plasma addressed liquid crystal) applications having negative $\Delta\in$.

The liquid-crystalline media according to the invention preferably comprise 4 to 15, in particular 5 to 12, and particularly preferably 10 or less, compounds. These are preferably selected from the group of the compounds of the formulae I, II-1 to II-4, and/or IV and/or V.

The liquid-crystalline media according to the invention may optionally also comprise more than 18 compounds. In this case, they preferably comprise 18 to 25 compounds.

Besides compounds of the formulae I to V, other constituents may also be present, for example in an amount of up to 45%, but preferably up to 35%, in particular up to 10%, of the mixture as a whole.

The media according to the invention may optionally also comprise a dielectrically positive component, whose total concentration is preferably 10% or less, based on the entire medium.

In a preferred embodiment, the liquid-crystal media according to the invention comprise in total, based on the mixture as a whole, 10 ppm or more to 1000 ppm or less, preferably 50 ppm or more to 500 ppm or less, particularly preferably 100 ppm or more to 400 ppm or less and very particularly preferably 150 ppm or more to 300 ppm or less, of the compound of the formula I, 20% or more to 60% or less, preferably 25% or more to 50% or less, particularly preferably 30% or more to 45% or less, of compounds of the formulae II-1 to II-4.

In a preferred embodiment, the liquid-crystal media according to the invention comprise compounds selected from the group of the compounds of the formulae I, II-1 to II-4, III-3, IV and V, preferably selected from the group of the compounds of the formulae I and II-1 to II-4; they preferably consist predominantly, particularly preferably essentially and very particularly preferably virtually completely of the compounds of the said formulae.

The liquid-crystal media according to the invention preferably have a nematic phase from in each case at least −20° C. or less to 70° C. or more, particularly preferably from −30° C. or less to 80° C. or more, very particularly preferably from −40° C. or less to 85° C. or more and most preferably from −40° C. or less to 90° C. or more.

The expression "have a nematic phase" here means on the one hand that no smectic phase and no crystallization are observed at low temperatures at the corresponding temperature and on the other hand that no clearing occurs on heating out of the nematic phase. The investigation at low temperatures is carried out in a flow viscometer at the corresponding temperature and checked by storage in test cells having a cell thickness corresponding to the electro-optical application for at least 100 hours. If the storage stability at a temperature of −20° C. in a corresponding test cell is 1000 h or more, the medium is regarded as stable at this temperature. At temperatures of −30° C. and −40° C., the corresponding times are 500 h and 250 h respectively. At high temperatures, the clearing point is measured in capillaries by conventional methods.

In a preferred embodiment, the liquid-crystal media according to the invention are characterized by optical anisotropy values in the moderate to low range. The birefringence values are preferably in the range from 0.065 or more to 0.130 or less, particularly preferably in the range from 0.080 or more to 0.120 or less and very particularly preferably in the range from 0.085 or more to 0.110 or less.

In this embodiment, the liquid-crystal media according to the invention have negative dielectric anisotropy and relatively high absolute values of the dielectric anisotropy ($|\Delta\in|$) which are preferably in the range from 2.0 or more to 5.5 or less, preferably to 5.0 or less, preferably from 2.5 or more to 4.7 or less, particularly preferably from 3.0 or more to 4.7 or less and very particularly preferably from 3.2 or more to 4.5 or less.

The liquid-crystal media according to the invention have relatively low values for the threshold voltage ($V_0$) in the range from 1.7 V or more to 2.5 V or less, preferably from 1.8 V or more to 2.4 V or less, particularly preferably from 1.9 V or more to 2.3 V or less and very particularly preferably from 1.95 V or more to 2.1 V or less.

In a further preferred embodiment, the liquid-crystal media according to the invention preferably have relatively low values of the average dielectric anisotropy ($\in_{av.} \equiv (\in_{\parallel} + 2\in_{\perp})/3$) which are preferably in the range from 5.0 or more to 8.0 or less, preferably from 5.4 or more to 7.5 or less, still more preferably from 5.5 or more to 7.3 or less, particularly preferably from 5.6 or more to 7.1 or less and very particularly preferably from 5.7 or more to 6.8 or less.

In addition, the liquid-crystal media according to the invention have high values for the VHR in liquid-crystal cells.

In freshly filled cells at 20° C. in the cells, these are greater than or equal to 95%, preferably greater than or equal to 97%, particularly preferably greater than or equal to 98% and very particularly preferably greater than or equal to 99%, and after 5 minutes in the oven at 100° C. in the cells, these are greater than or equal to 80%, preferably greater than or equal to 85%, particularly preferably greater than or equal to 90% and very particularly preferably greater than or equal to 95%.

In general, liquid-crystal media having a low addressing voltage or threshold voltage here have a lower VHR than those having a higher addressing voltage or threshold voltage, and vice versa.

These preferred values for the individual physical properties are preferably also in each case maintained by the media according to the invention in combination with one another.

In the present application, the term "compounds", also written as "compound(s)", means both one and also a plurality of compounds, unless explicitly indicated otherwise.

Unless indicated otherwise, the individual compounds are generally employed in the mixtures in concentrations in each case from 1% or more to 30% or less, preferably from 2% or more to 30% or less and particularly preferably from 3% or more to 16% or less.

In a preferred embodiment, the liquid-crystalline media according to the invention comprise
the compound of the formula I,
one or more compounds of the formula IV, preferably selected from the group of the compounds of the formulae CC-n-V and CC-n-Vm, preferably CC-3-V, CC-3-V1, CC-4-V and CC-5-V, particularly preferably selected from the group of the compounds CC-3-V, CC-3-V1 and CC-4-V, very particularly preferably the compound CC-3-V, and optionally additionally the compound(s) CC-4-V and/or CC-3-V1,
one or more compounds of the formula II-1-1, preferably of the formula CY-n-Om, selected from the group of the compounds of the formulae CY-3-O2, CY-3-O4, CY-5-O2 and CY-5-O4,
one or more compounds of the formula II-1-2, preferably selected from the group of the compounds of the formulae CCY-n-m and CCY-n-Om, preferably of the formula CCY-n-Om, preferably selected from the group of the compounds of the formulae CCY-3-O2, CCY-2-O2, CCY-3-O1, CCY-3-O3, CCY-4-O2, CCY-3-O2 and CCY-5-O2,
optionally, preferably obligatorily, one or more compounds of the formula II-2-2, preferably of the formula CLY-n-Om, preferably selected from the group of the compounds of the formulae CLY-2-O4, CLY-3-O2, CLY-3-O3,
one or more compounds of the formula II-3-2, preferably of the formula CPY-n-Om, preferably selected from the group of the compounds of the formulae CPY-2-O2 and CPY-3-O2, CPY-4-O2 and CPY-5-O2,
one or more compounds of the formula II-4, preferably of the formula PYP-n-m, preferably selected from the group of the compounds of the formulae PYP-2-3 and PYP-2-4,
one or more compounds of the formula III-3, preferably the compound of the formula B-2O-O5.

The compounds of the formula I according to the invention are known to the person skilled in the art or can be prepared analogously by conventional processes known from the literature from commercially available 4-hydroxy-2,2,6,6-tetramethyl-1-piperidinyl N-oxide (CAS No. 2226-96-2) (see, for example, Houben Weyl, Methoden der Organischen Chemie [Methods of Organic Chemistry], Thieme-Verlag, Stuttgart).

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "virtually completely consist of": the concentration of the constituents in question in the composition is preferably 98% or more, particularly preferably 99% or more and very particularly preferably 100.0%.

This applies both to the media as compositions with their constituents, which can be components and compounds, and also to the components with their constituents, the compounds. Only in relation to the concentration of an individual compound relative to the medium as a whole does the term comprise mean: the concentration of the compound in question is preferably 1% or more, particularly preferably 2% or more, very particularly preferably 4% or more.

For the present invention, "≤" means less than or equal to, preferably less than, and "≥" means greater than or equal to, preferably greater than.

For the present invention,

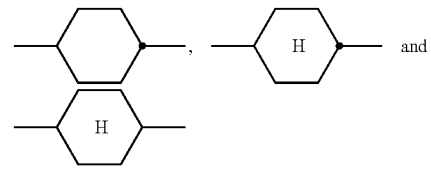

denote trans-1,4-cyclohexylene, and

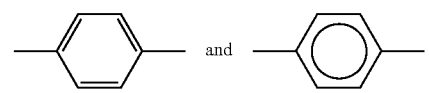

denote 1,4-phenylene.

For the present invention, the expression "dielectrically positive compounds" means compounds having a Δε of >1.5, the expression "dielectrically neutral compounds" means those where $-1.5 \leq \Delta\varepsilon \leq 1.5$ and the expression "dielectrically negative compounds" means those where $\Delta\varepsilon < -1.5$. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed.

The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilizers and/or pleochroic dyes and/or chiral dopants in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

In a preferred embodiment, the liquid-crystal media according to the invention comprise a polymer precursor which comprises one or more reactive compounds, preferably reactive mesogens, and, if necessary, also further additives, such as, for example, polymerization initiators and/or polymerization moderators, in the usual amounts. The amount of these additives employed is in total 0% or more to 10% or less, based on the amount of the entire mixture, preferably 0.1% or more to 2% or less. The concentration of these and similar additives is not taken into account when specifying the concentrations and concentration ranges of the liquid-crystal compounds in the liquid-crystal media.

The compositions consist of a plurality of compounds, preferably 3 or more to 30 or fewer, particularly preferably 6 or more to 20 or fewer and very particularly preferably 10 or more to 16 or fewer compounds, which are mixed in a conventional manner. In general, the desired amount of the components used in lesser amount is dissolved in the components making up the principal constituent of the mixture. This is advantageously carried out at elevated temperature. If the selected temperature is above the clearing point of the principal constituent, completion of the dissolution operation is particularly easy to observe. However, it is also possible to prepare the liquid-crystal mixtures in other conventional ways, for example using pre-mixes or from a so-called "multibottle system".

The mixtures according to the invention exhibit very broad nematic phase ranges having clearing points of 65° C. or more, very favorable values for the capacitive threshold, relatively high values for the holding ratio and at the same time very good low-temperature stabilities at −30° C. and −40° C. Furthermore, the mixtures according to the invention are distinguished by low rotational viscosities $\gamma_1$.

It goes without saying to the person skilled in the art that the media according to the invention for use in VA, IPS, FFS or PALC displays may also comprise compounds in which, for example, H, N, O, Cl, F have been replaced by the corresponding isotopes.

The structure of the liquid-crystal displays according to the invention corresponds to the usual geometry, as described, for example, in EP 0 240 379 A1, hereby incorporated by reference.

The liquid-crystal phases according to the invention can be modified by means of suitable additives in such a way that they can be employed in any type of, for example, ECB, VAN, IPS, GH (guest host) or ASM-VA (axially symmetric microdomain vertical alignment) LCD display that has been disclosed to date.

Table E below indicates possible dopants which can be added to the mixtures according to the invention. If the mixtures comprise one or more dopants, it is (they are) employed in amounts of 0.01 to 4%, preferably 0.1 to 1.0%.

Stabilizers which can be added, for example, to the mixtures according to the invention, preferably in amounts of 0.01 to 6%, in particular 0.1 to 3%, are shown below in Table F.

For the purposes of the present invention, all concentrations are, unless explicitly noted otherwise, indicated in percent by weight and relate to the corresponding mixture or mixture component, unless explicitly indicated otherwise.

All temperature values indicated in the present application, such as, for example, the melting point T(C,N), the smectic (S) to nematic (N) phase transition T(S,N) and the clearing point T(N,I), are indicated in degrees Celsius (° C.) and all temperature differences are correspondingly indicated in differential degrees (° or degrees), unless explicitly indicated otherwise.

For the present invention, the term "threshold voltage" relates to the capacitive threshold ($V_0$), also known as the Freedericks threshold, unless explicitly indicated otherwise.

All physical properties are and have been determined in accordance with "Merck Liquid Crystals, Physical Properties of Liquid Crystals", status November 1997, Merck KGaA, Germany, and apply for a temperature of 20° C., and $\Delta n$ is determined at 589 nm and $\Delta \in$ at 1 kHz, unless explicitly indicated otherwise in each case.

The electro-optical properties, for example the threshold voltage ($V_0$) (capacitive measurement), are, as is the switching behavior, determined in test cells produced at Merck Japan. The measurement cells have soda-lime glass substrates and are constructed in an ECB or VA configuration with polyimide alignment layers (SE-1211 with diluent **26 (mixing ratio 1:1), both from Nissan Chemicals, Japan), which have been rubbed perpendicularly to one another and effect homeotropic alignment of the liquid crystals. The surface area of the transparent, virtually square ITO electrodes is 1 cm².

Unless indicated otherwise, a chiral dopant is not added to the liquid-crystal mixtures used, but the latter are also particularly suitable for applications in which doping of this type is necessary.

The VHR is determined in test cells produced at Merck Japan. The test cells have alkali-free glass substrates and are provided with polyimide alignment layers with a layer thickness of 50 nm, which result in planar alignment of the liquid crystals. The layer gap is a uniform 3.0 μm or 6.0 μm. The surface area of the transparent ITO electrodes is 1 cm².

Unless indicated otherwise, the VHR is determined at 20° C. ($VHR_{20}$) and after 5 minutes in an oven at 100° C. ($VHR_{100}$) in a commercially available instrument from Autronic Melchers, Germany. The voltage used has a frequency of in a range from 1 Hz to 60 Hz, unless indicated more precisely.

The accuracy of the VHR measurement values depends on the respective value of the VHR. The accuracy decreases with decreasing values. The deviations generally observed in the case of values in the various magnitude ranges are compiled in their order of magnitude in the following table.

| VHR range VHR values | | Deviation (relative) $\Delta_G VHR/VHR/\%$ |
|---|---|---|
| from | to | Approx. |
| 99.6% | 100% | +/−0.1 |
| 99.0% | 99.6% | +/−0.2 |
| 98% | 99% | +/−0.3 |
| 95% | 98% | +/−0.5 |
| 90% | 95% | +/−1 |

-continued

| VHR range VHR values | | Deviation (relative) $\Delta_G$VHR/VHR/% |
|---|---|---|
| from | to | Approx. |
| 80% | 90% | +/−2 |
| 60% | 80% | +/−4 |
| 40% | 60% | +/−8 |
| 20% | 40% | +/−10 |
| 10% | 20% | +/−20 |

The stability to UV irradiation is investigated in a "Suntest CPS", a commercial instrument from Heraeus, Germany. The sealed test cells are irradiated for between 30 min and 2.0 hours, unless explicitly indicated, without additional heating. The irradiation power in the wavelength range from 300 nm to 800 nm is 765 W/m² V. A UV "cut-off" filter having an edge wavelength of 310 nm is used in order to simulate the so-called window glass mode. In each series of experiments, at least four test cells are investigated for each condition, and the respective results are indicated as averages of the corresponding individual measurements.

The decrease in the voltage holding ratio (ΔVHR) usually caused by the exposure, for example by UV irradiation by LCD backlighting, is determined in accordance with the following equation (1):

$$\Delta VHR(t) = VHR(t) - VHR(t=0) \quad (1).$$

The rotational viscosity is determined using the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (ν) are 21 mm²·s⁻¹, 14 mm²·s⁻¹ and 27 mm²·s⁻¹ respectively.

The following symbols are used, unless explicitly indicated otherwise:
$V_0$ threshold voltage, capacitive [V] at 20° C.,
$n_e$ extraordinary refractive index measured at 20° C. and 589 nm,
$n_o$ ordinary refractive index measured at 20° C. and 589 nm,
Δn optical anisotropy measured at 20° C. and 589 nm,
$\in_\perp$ dielectric susceptibility perpendicular to the director at 20° C. and 1 kHz,
$\in_\parallel$ dielectric susceptibility parallel to the director at 20° C. and 1 kHz,
Δ∈ dielectric anisotropy at 20° C. and 1 kHz,
cl.p. or T(N,I) clearing point [° C.],
ν flow viscosity measured at 20° C. [mm²·s⁻¹],
$\gamma_1$ rotational viscosity measured at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN], and
LTS low-temperature stability of the phase, determined in test cells,
VHR voltage holding ratio,
ΔVHR decrease in the voltage holding ratio,
$S_{rel}$ relative stability of the VHR.

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

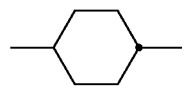 C

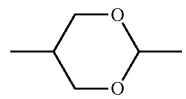 D

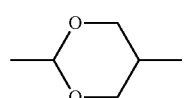 DI

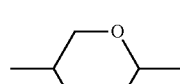 A

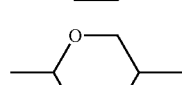 AI

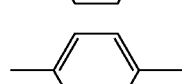 P

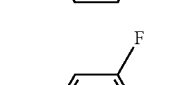 G

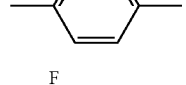 GI

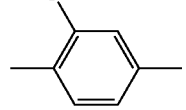 U

TABLE A-continued
Ring elements
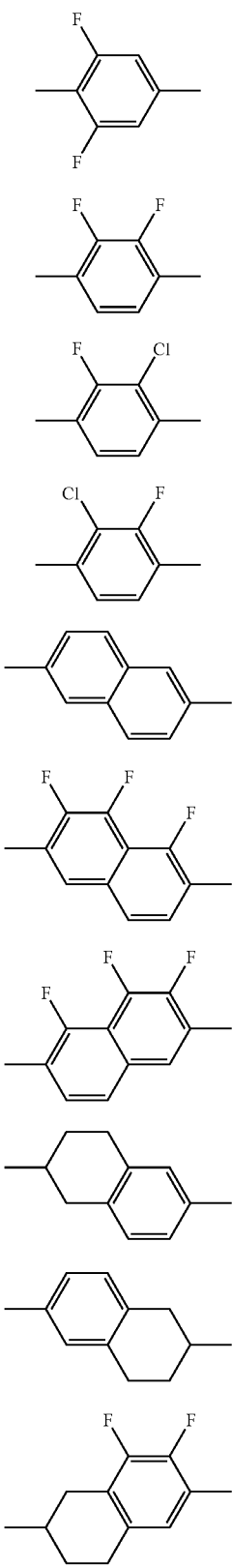
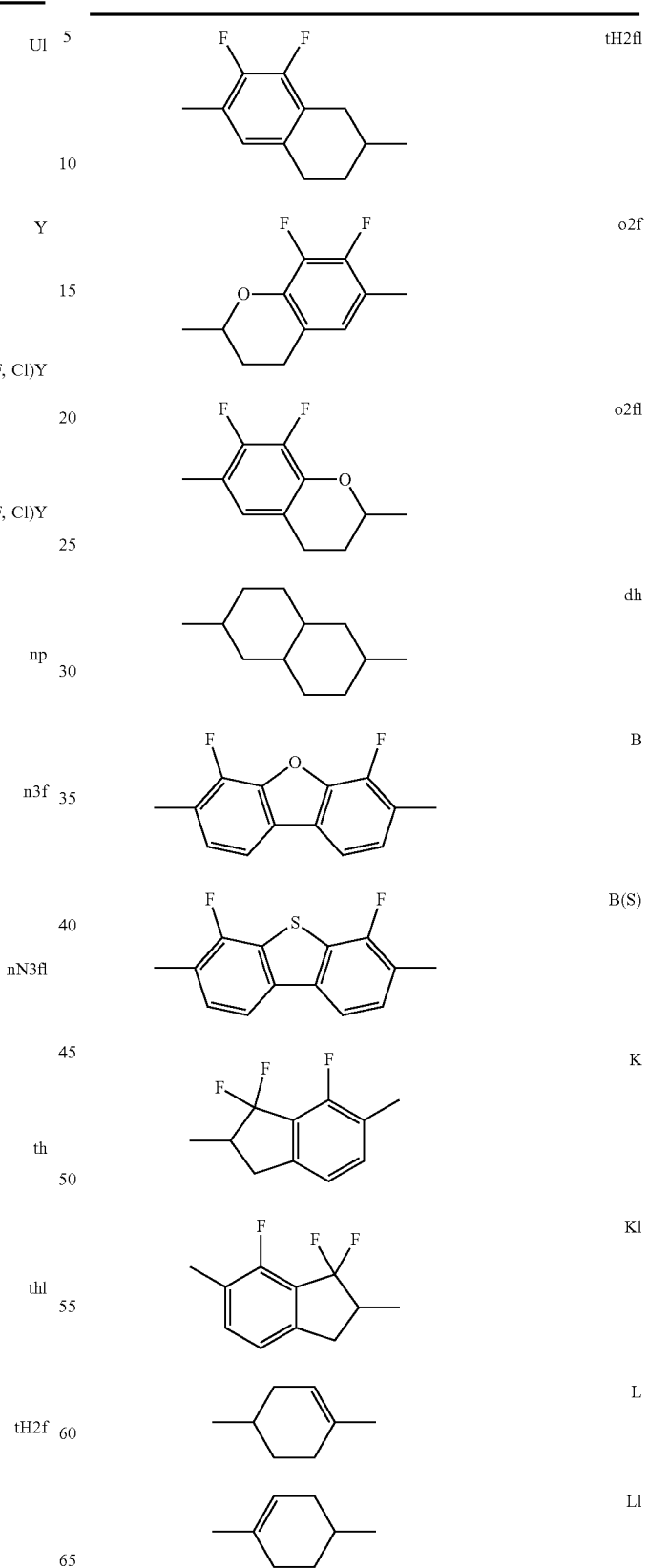

TABLE A-continued

Ring elements

[structure: cyclohexene with F substituent] F

[structure: cyclohexene with F substituent] Fl

TABLE B

Bridging members

| | | | | |
|---|---|---|---|---|
| E | —$CH_2$—$CH_2$— | | | |
| V | —CH=CH— | | | |
| T | —C≡C— | | | |
| W | —$CF_2$—$CF_2$— | | | |
| B | —CF=CF— | | | |
| Z | —CO—O— | ZI | —O—CO— |
| X | —CF=CH— | XI | —CH=CF— |
| O | —$CH_2$—O— | OI | —O—$CH_2$— |
| Q | —$CF_2$—O— | QI | —O—$CF_2$— |

TABLE C

End groups

| On the left individually or in combination | | On the right individually or in combination | |
|---|---|---|---|
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2$H- | -D | —$CF_2$H |
| -T- | $CF_3$— | -T | —$CF_3$ |
| -MO- | $CFH_2$O— | -OM | —$OCFH_2$ |
| -DO- | $CF_2$HO— | -OD | —$OCF_2$H |
| -TO- | $CF_3$O — | -OT | —$OCF_3$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |

| On the left only in combination | | On the right only in combination | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m are each integers, and the three dots "..." are place-holders for other abbreviations from this table.

Besides the compounds of the formula I, the mixtures according to the invention preferably comprise one or more compounds of the compounds mentioned below.

The following abbreviations are used:
(n, m and z are, independently of one another, each an integer, preferably 1 to 6)

TABLE D

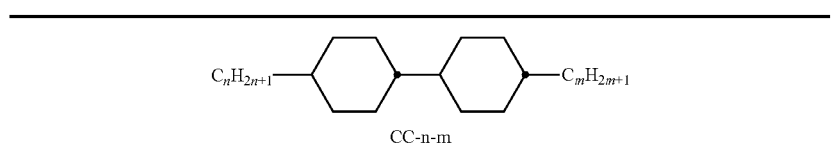

CC-n-m

TABLE D-continued
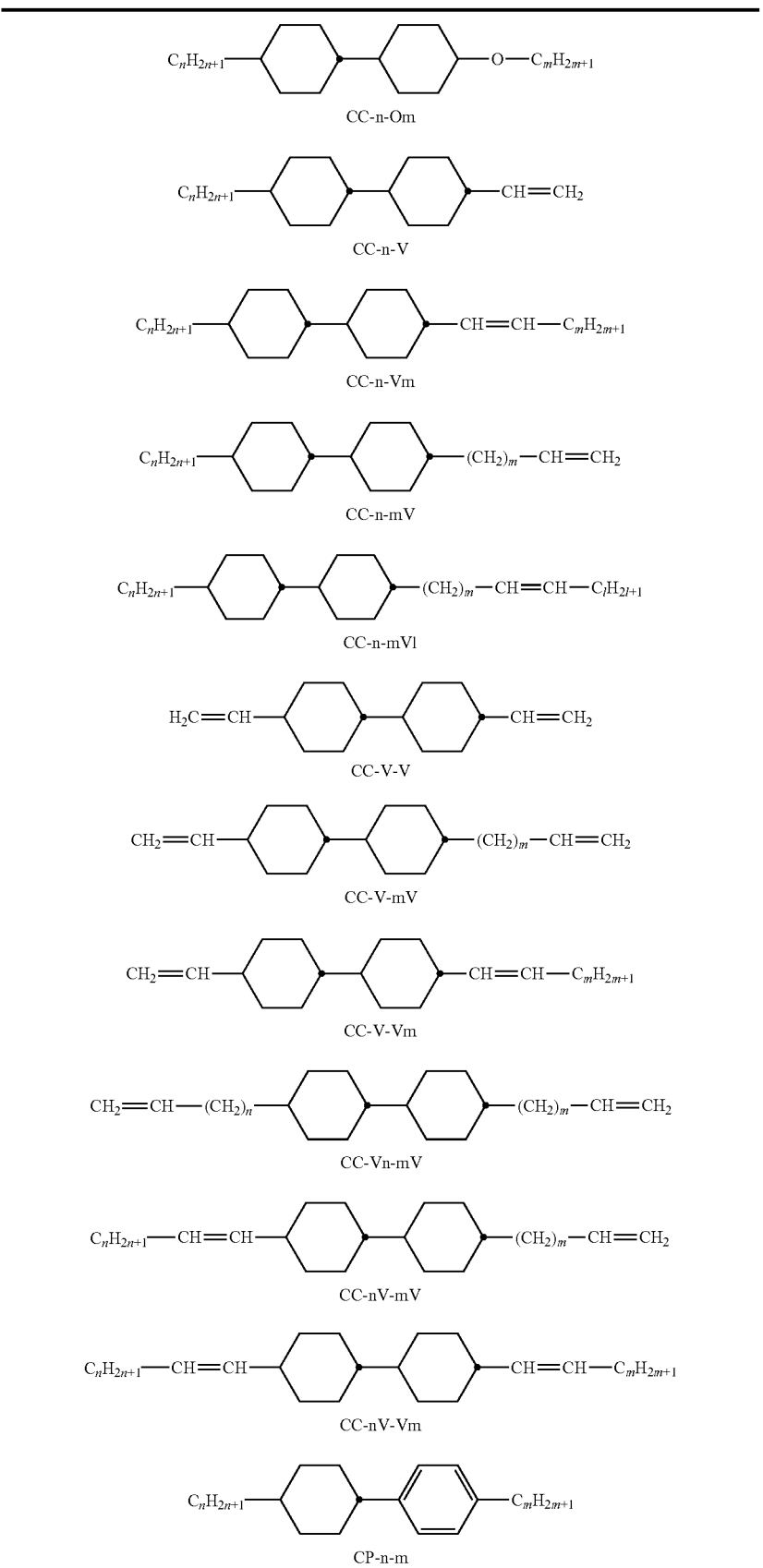

TABLE D-continued
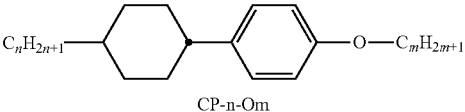
CP-n-Om
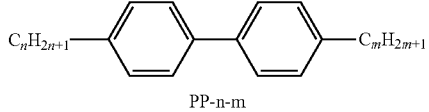
PP-n-m
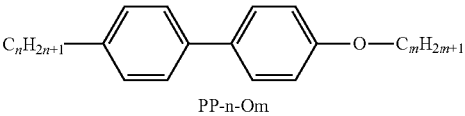
PP-n-Om
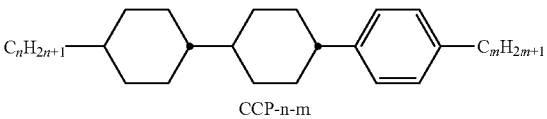
CCP-n-m
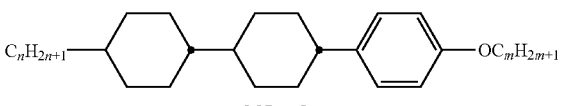
CCP-n-Om
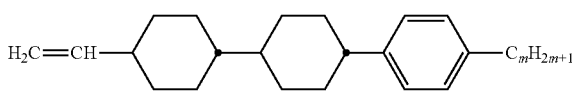
CCP-V-m
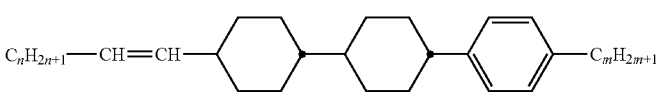
CCP-nV-m
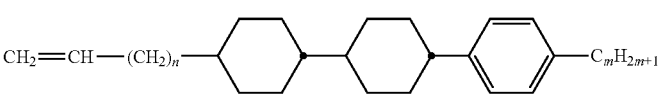
CCP-Vn-m
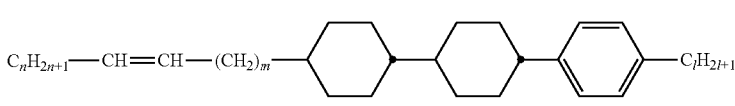
CCP-nVm-l
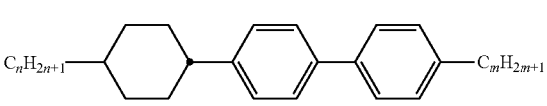
CPP-n-m
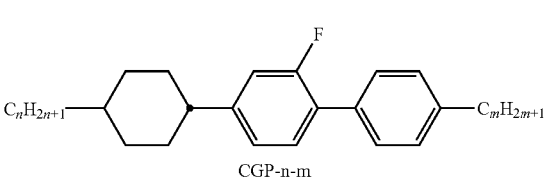
CGP-n-m TABLE D-continued
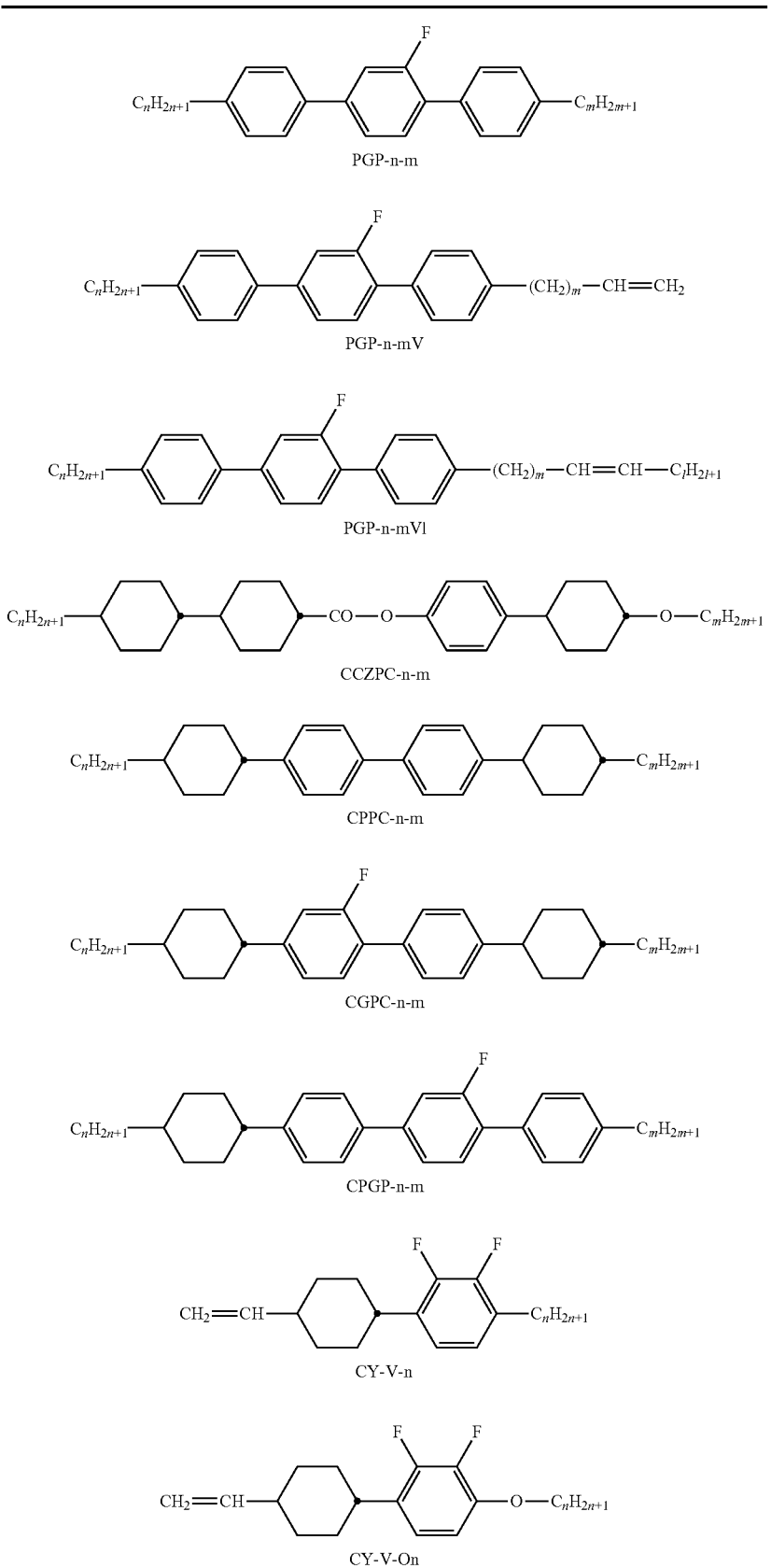

TABLE D-continued
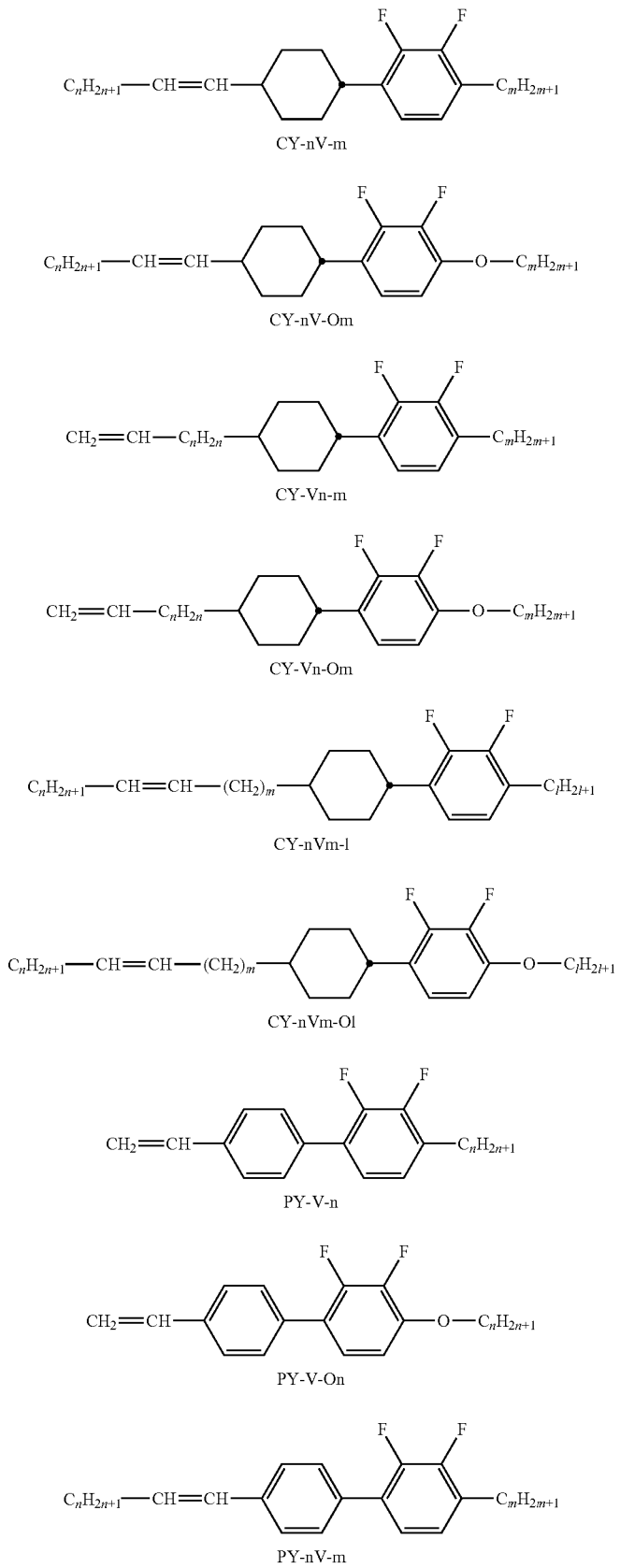

TABLE D-continued
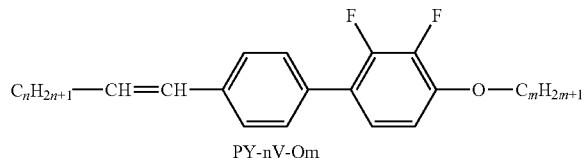
PY-nV-Om
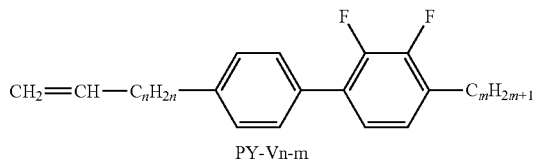
PY-Vn-m
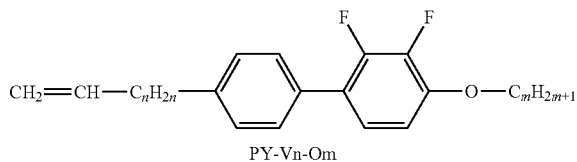
PY-Vn-Om
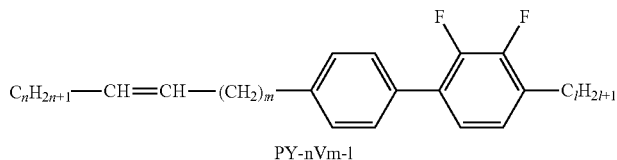
PY-nVm-l
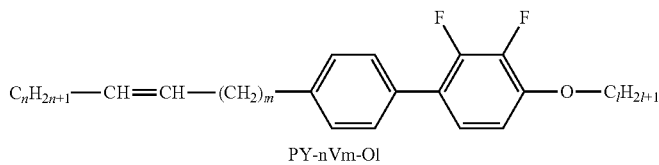
PY-nVm-Ol
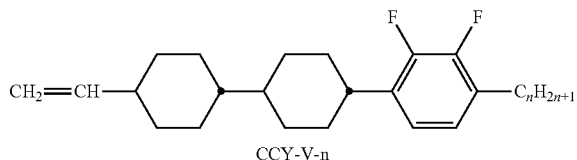
CCY-V-n
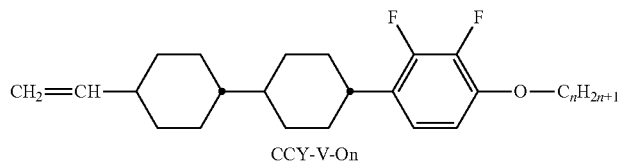
CCY-V-On
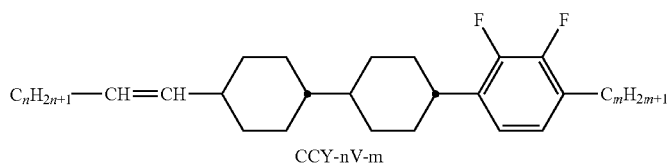
CCY-nV-m
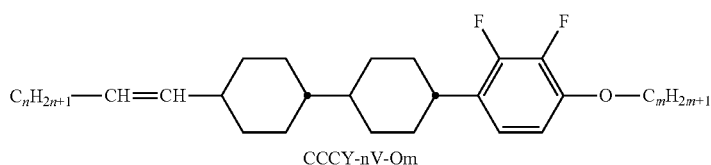
CCCY-nV-Om TABLE D-continued
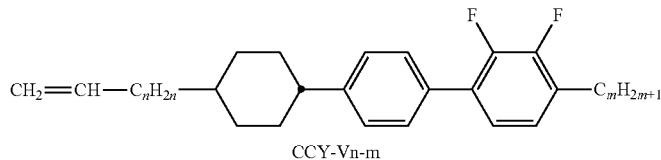
CCY-Vn-m
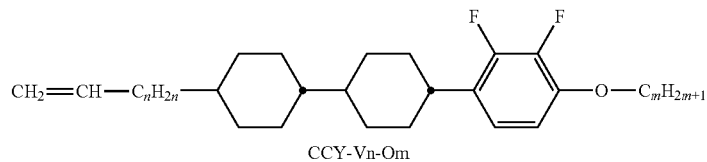
CCY-Vn-Om
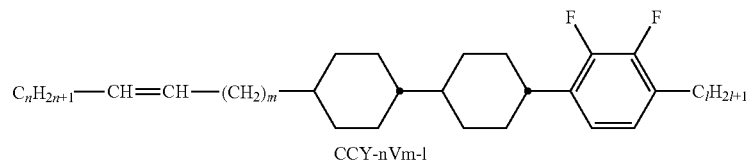
CCY-nVm-l
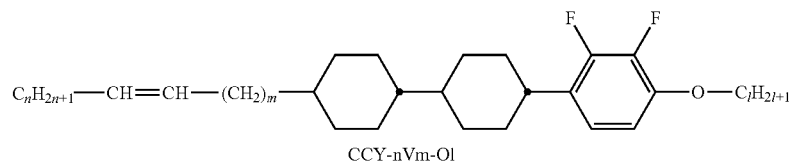
CCY-nVm-Ol
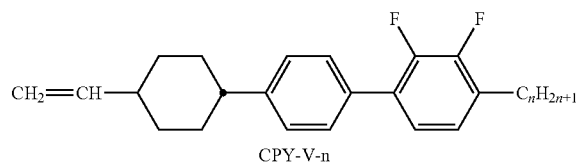
CPY-V-n
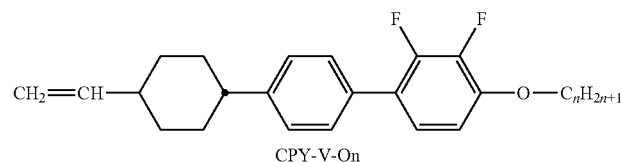
CPY-V-On
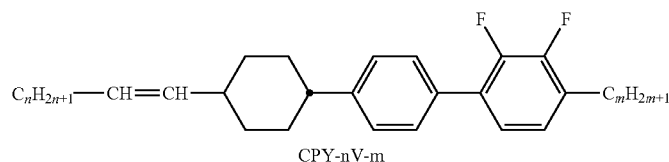
CPY-nV-m
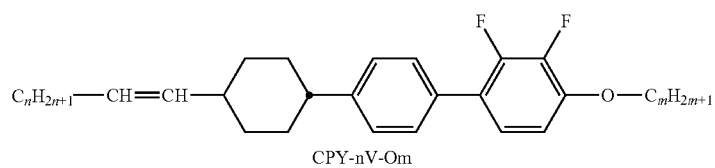
CPY-nV-Om
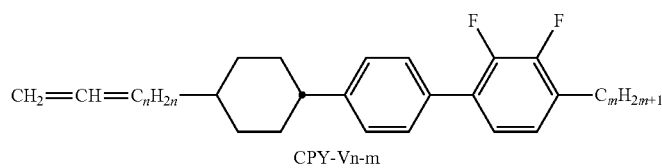
CPY-Vn-m TABLE D-continued
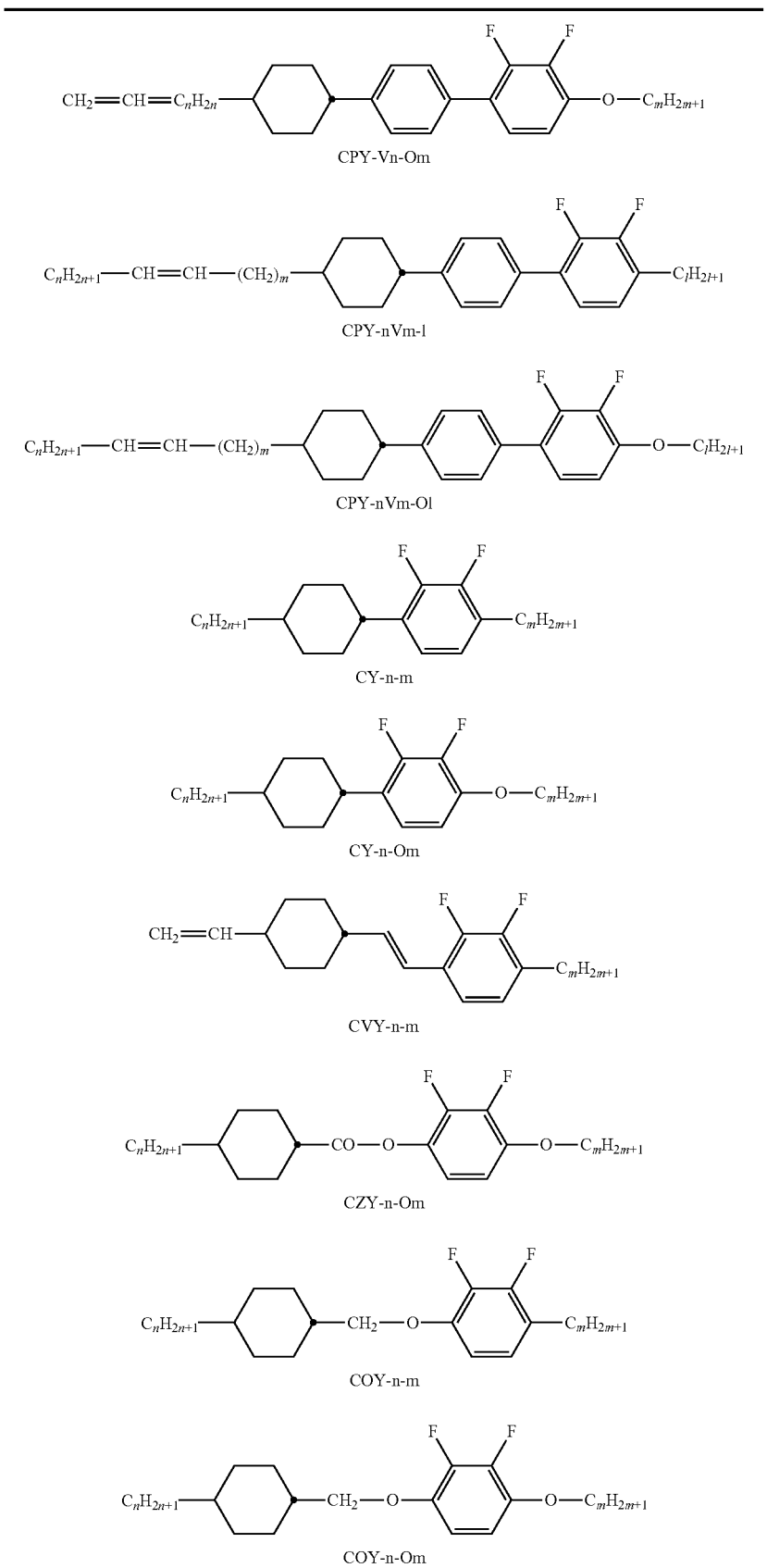

TABLE D-continued
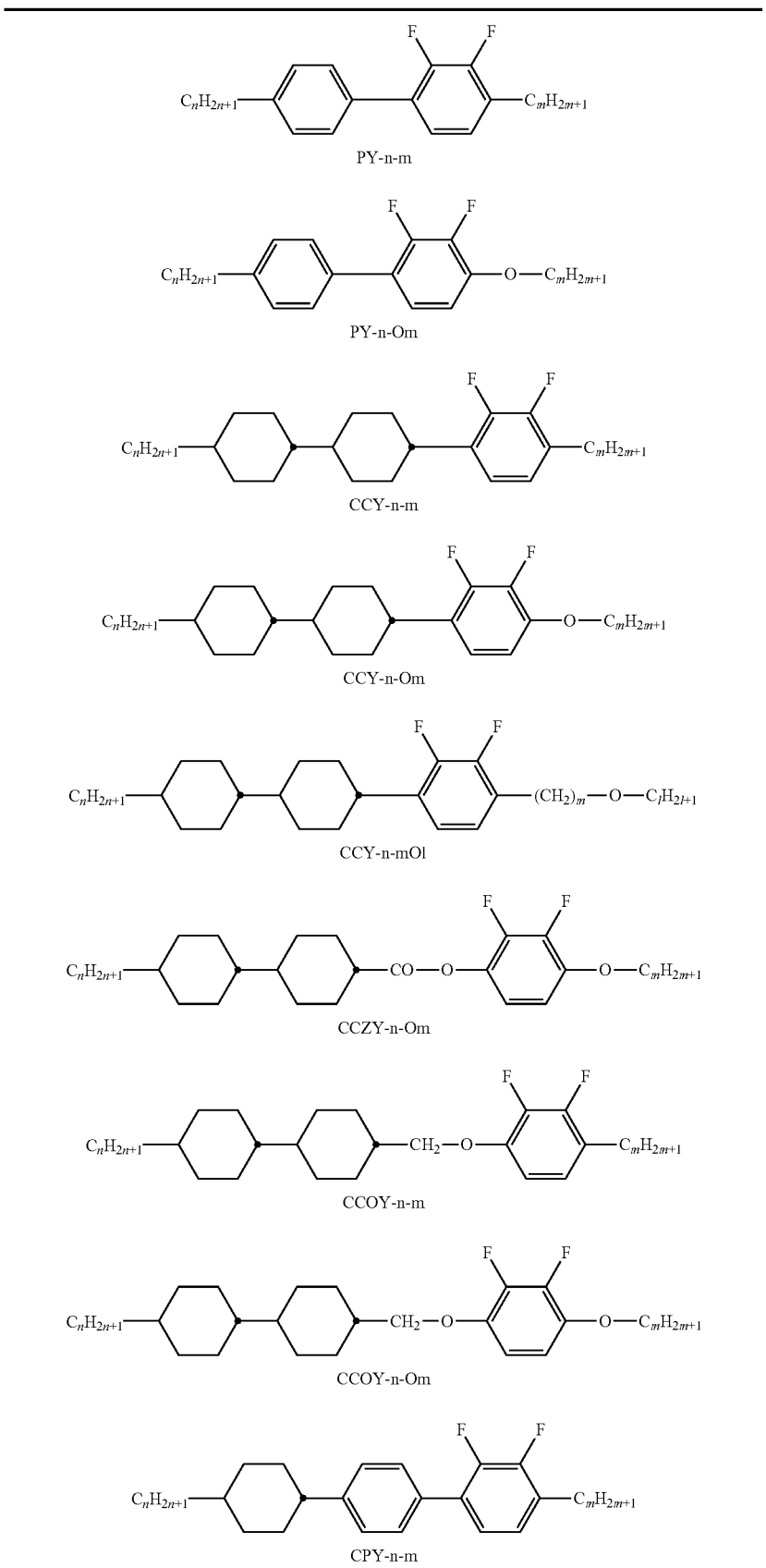

TABLE D-continued
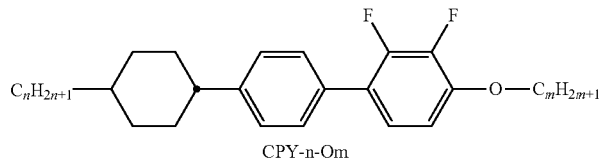
CPY-n-Om
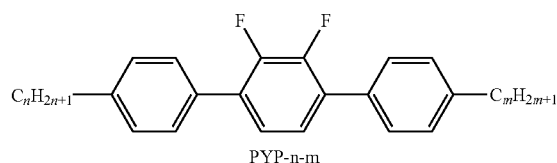
PYP-n-m
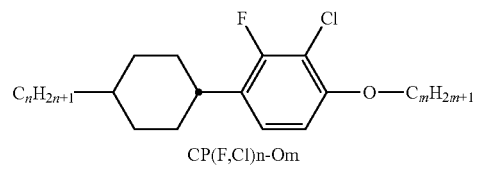
CP(F,Cl)n-Om
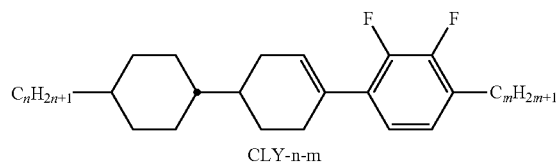
CLY-n-m
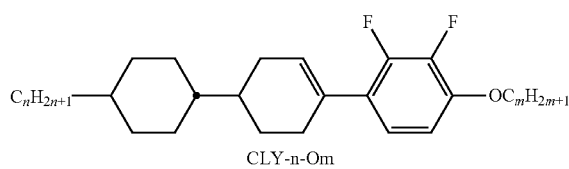
CLY-n-Om
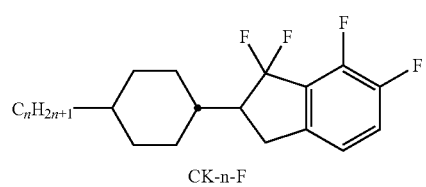
CK-n-F
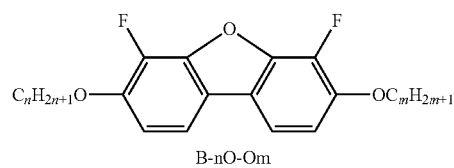
B-nO-Om
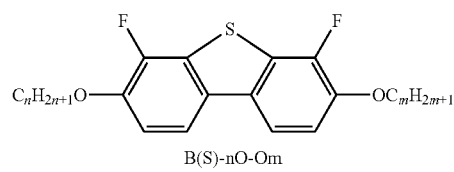
B(S)-nO-Om
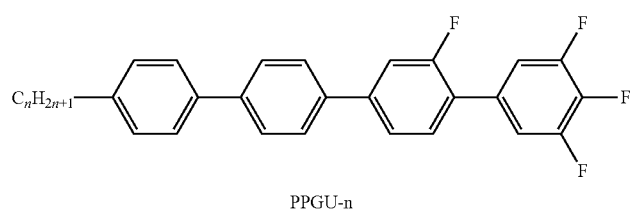
PPGU-n TABLE D-continued
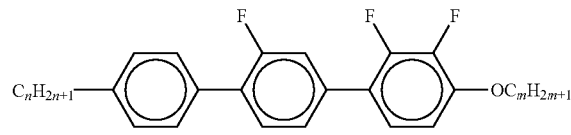
PGIY-n-Om
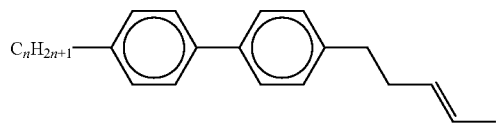
PP-n-2V1
Table E shows chiral dopants which are preferably employed in the mixtures according to the invention.
TABLE E
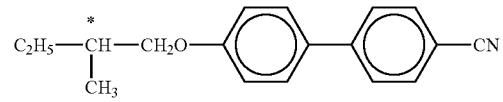
C 15
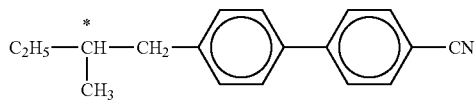
CB 15
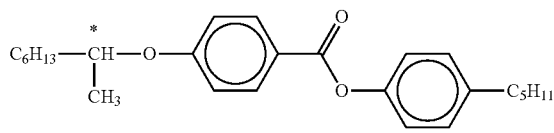
CM 21
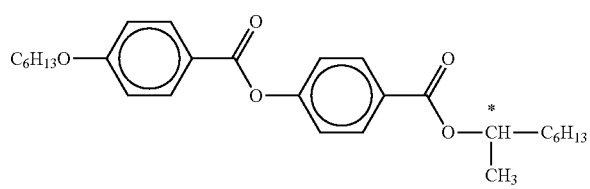
R S-811/S-811
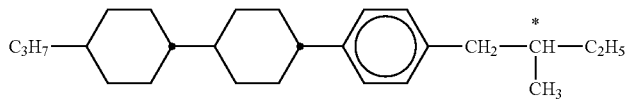
CM 44
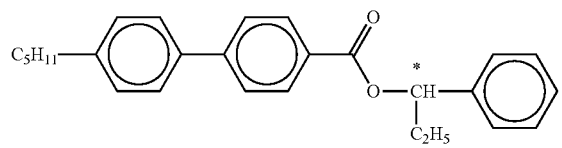
CM 45
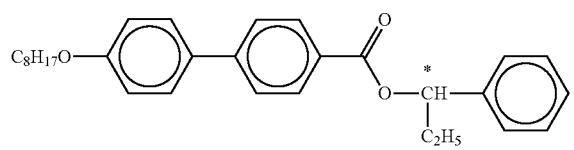
CM 47

TABLE E-continued

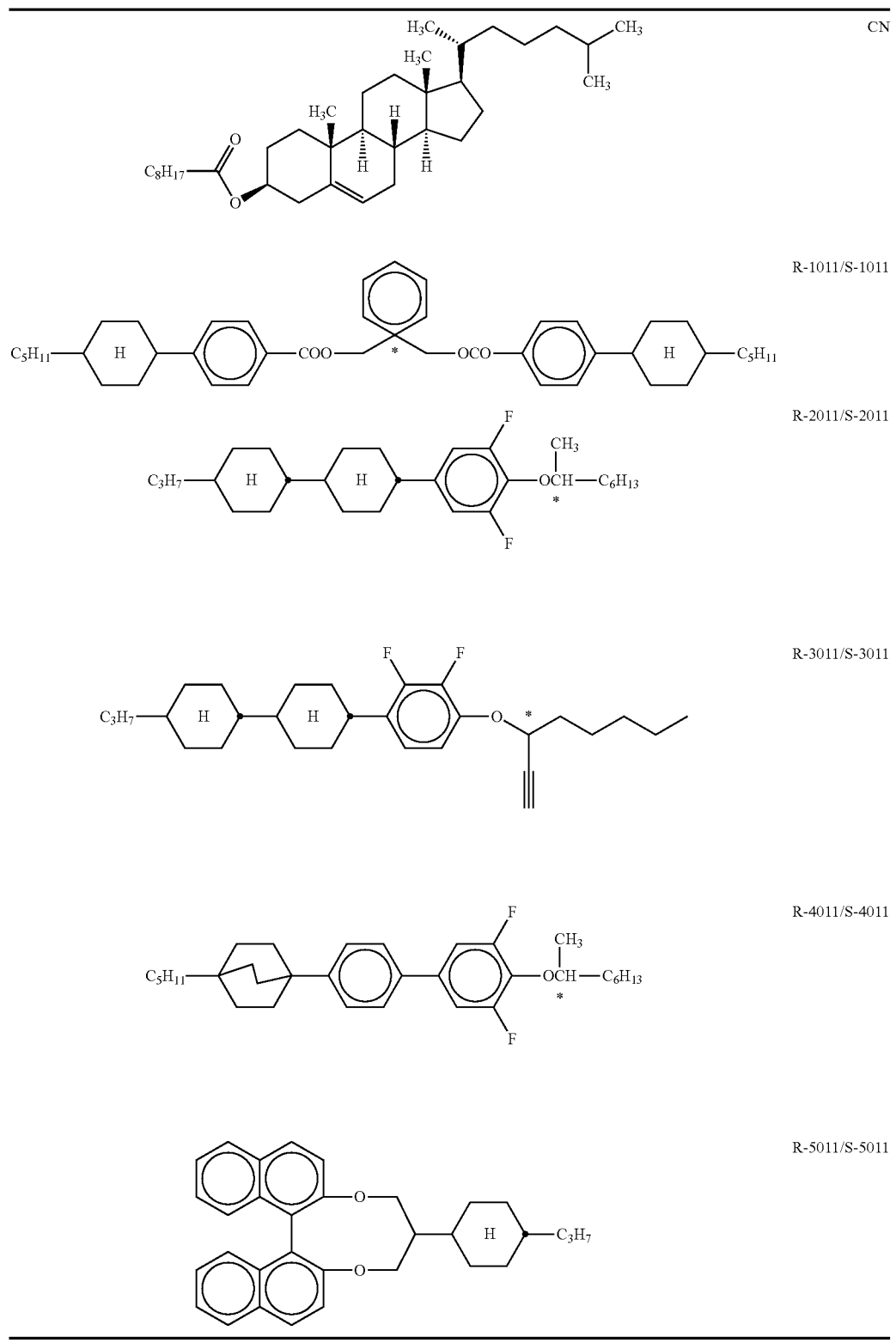

In a preferred embodiment of the present invention, the media according to the invention comprise one or more compounds selected from the group of the compounds from Table E.

Table F shows stabilizers which can be employed in the mixtures according to the invention in addition to the compounds of the formula I. The parameter n here denotes an integer in the range from 1 to 12. In particular, the phenol derivatives shown can be employed as additional stabilizers since they act as antioxidants.

TABLE F
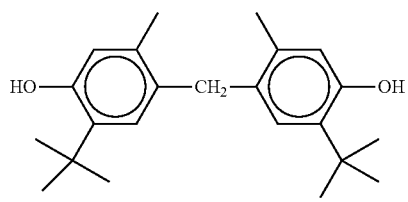
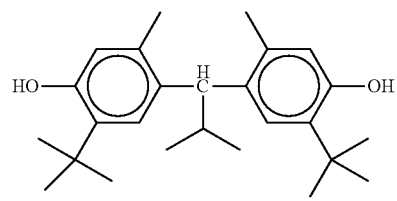
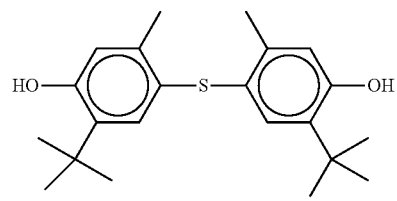
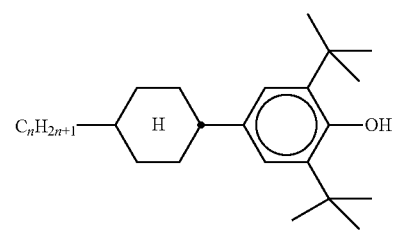
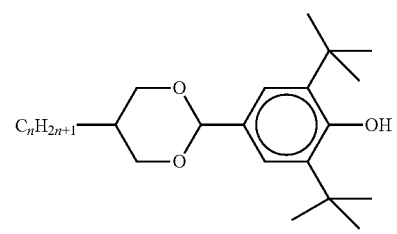
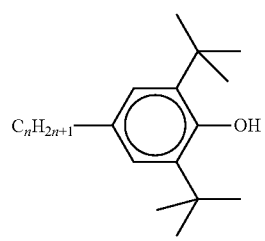
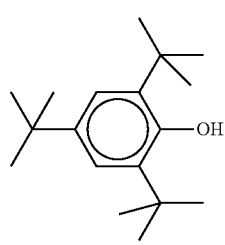

TABLE F-continued
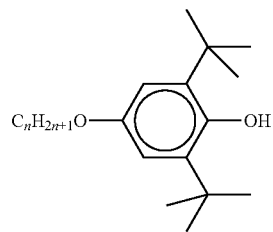
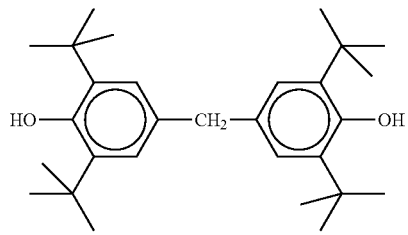
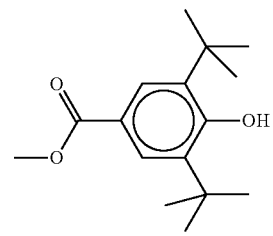
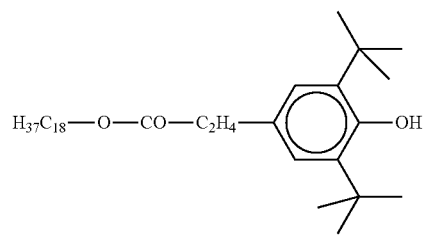
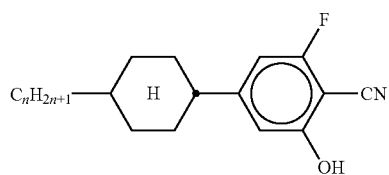
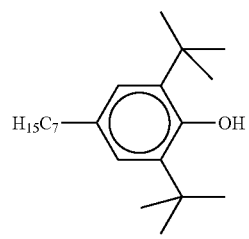
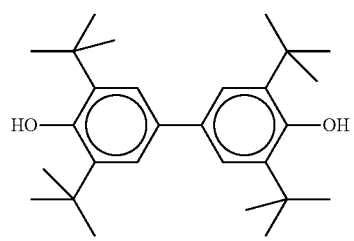

TABLE F-continued
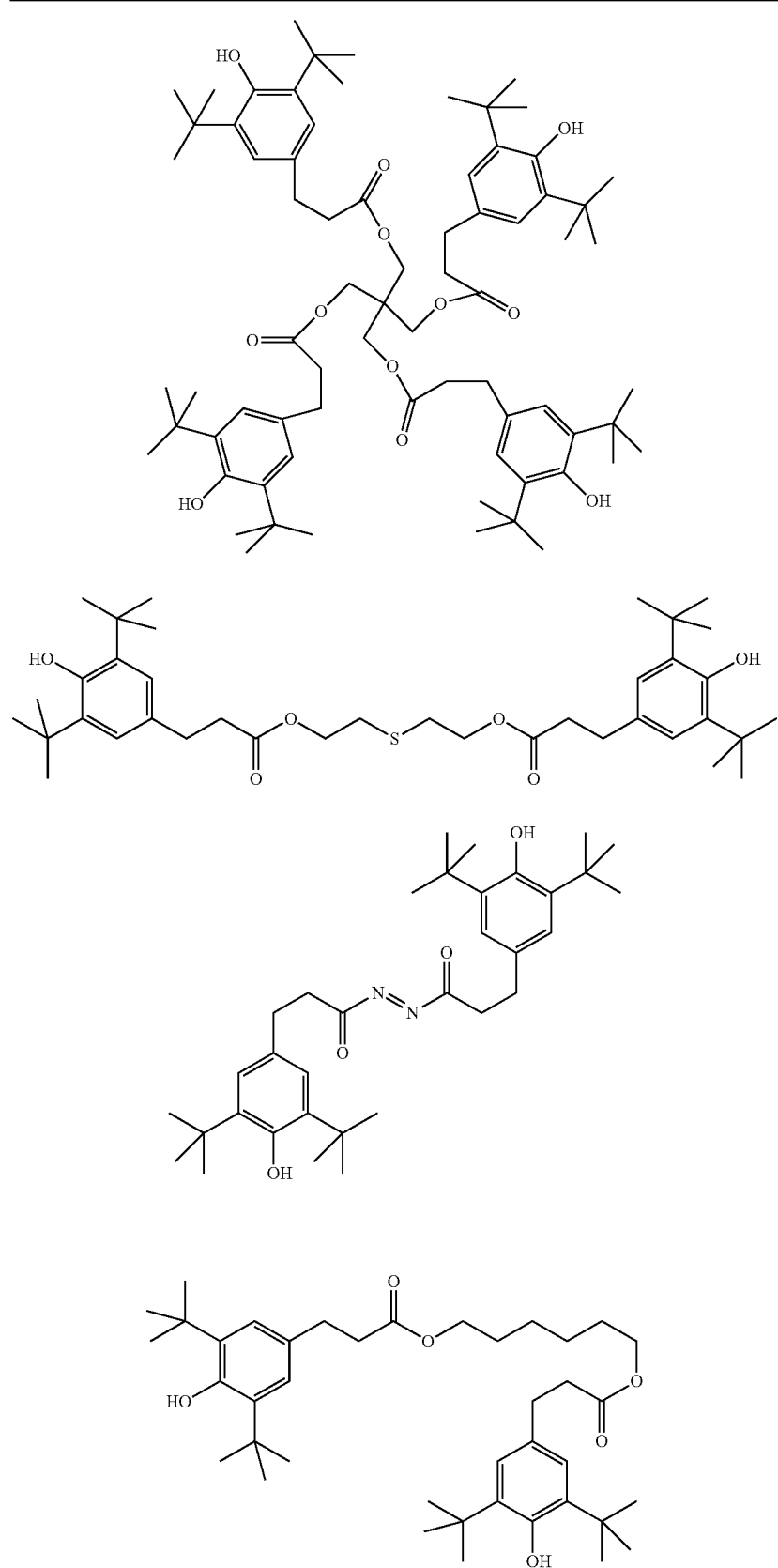

TABLE F-continued
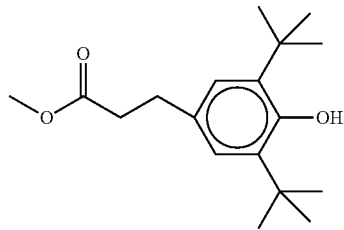
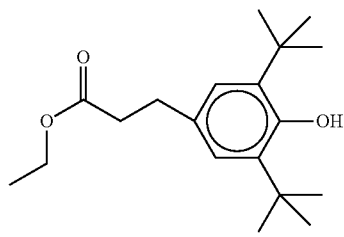
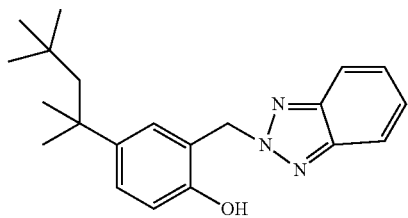 [SMILES: CC(C)(C)CC(C)(C)c1ccc(O)c(Cn2nc3ccccc3n2)c1]
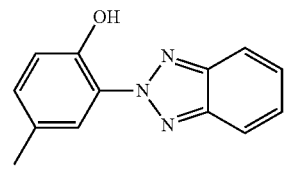 [SMILES: Cc1ccc(O)c(-n2nc3ccccc3n2)c1]
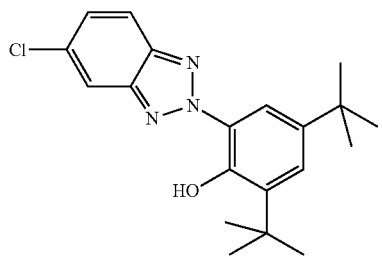 [SMILES: CC(C)(C)c1cc(-n2nc3ccc(Cl)cc3n2)c(O)c(C(C)(C)C)c1]
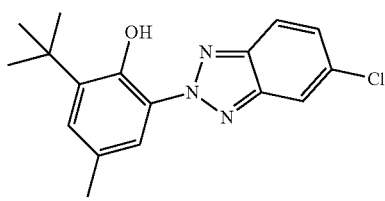 [SMILES: Cc1cc(-n2nc3ccc(Cl)cc3n2)c(O)c(C(C)(C)C)c1]

TABLE F-continued
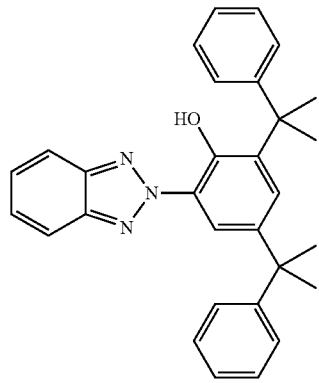 [SMILES: CC(C)(c1ccccc1)c1cc(-n2nc3ccccc3n2)c(O)c(C(C)(C)c2ccccc2)c1]
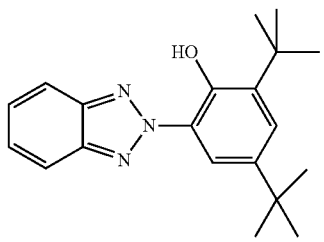 [SMILES: CC(C)(C)c1cc(-n2nc3ccccc3n2)c(O)c(C(C)(C)C)c1]
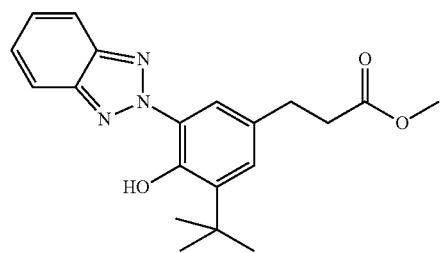 [SMILES: COC(=O)CCc1cc(-n2nc3ccccc3n2)c(O)c(C(C)(C)C)c1]
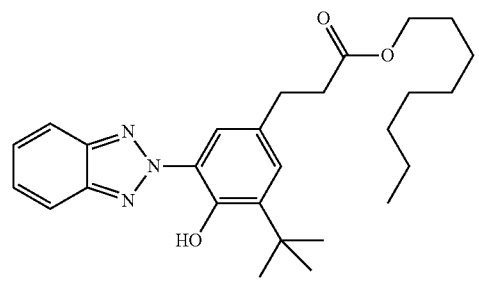 [SMILES: CCCCCCCCOC(=O)CCc1cc(-n2nc3ccccc3n2)c(O)c(C(C)(C)C)c1]

TABLE F-continued
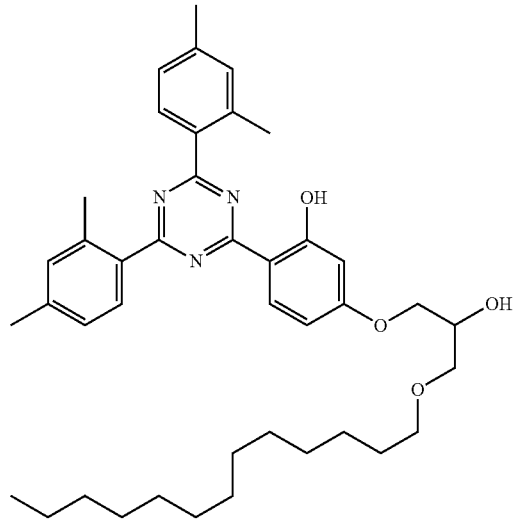 [SMILES: CCCCCCCCCCCCCOCC(O)COc1ccc(-c2nc(-c3ccc(C)cc3C)nc(-c3ccc(C)cc3C)n2)c(O)c1]
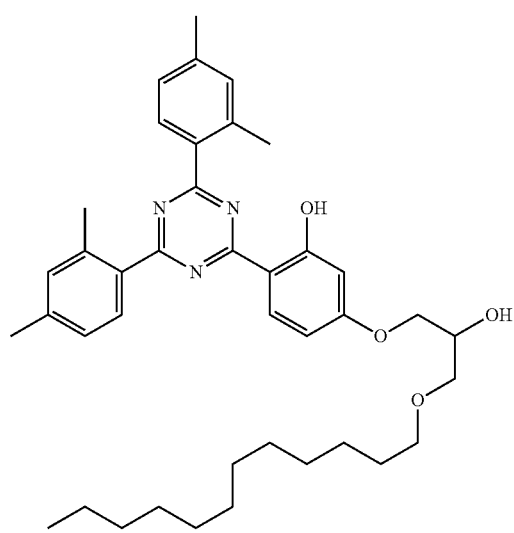 [SMILES: CCCCCCCCCCCCOCC(O)COc1ccc(-c2nc(-c3ccc(C)cc3C)nc(-c3ccc(C)cc3C)n2)c(O)c1]
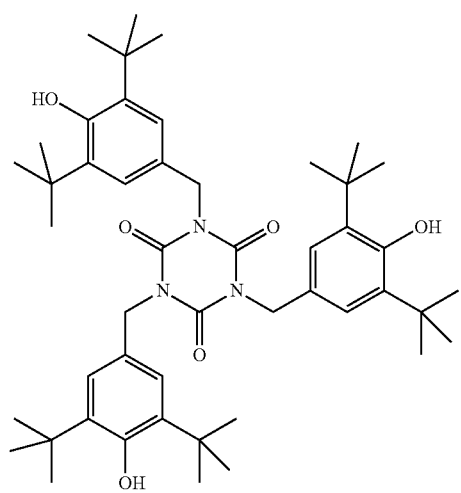 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE F-continued

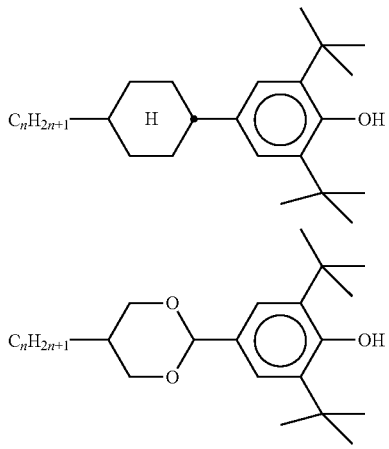

In a preferred embodiment of the present invention, the media according to the invention comprise one or more compounds selected from the group of the compounds from Table F, in particular one or more compounds selected from the group of the compounds of the two formulae

EXAMPLES

The following examples explain the present invention without restricting it in any way. However, the physical properties make it clear to the person skilled in the art what properties can be achieved and in what ranges they can be modified. In particular, the combination of the various properties which can preferably be achieved is thus well defined for the person skilled in the art.

Liquid-crystal mixtures having the compositions and properties as indicated in the following tables are prepared and investigated. The improved stability of the mixtures comprising compounds of the formula I is demonstrated by comparison with unstabilized base mixtures as reference (Ref.).

Examples 1.1 to 1.3

The following mixture (M-1) is prepared and investigated.

| Mixture M-1 | | |
|---|---|---|
| Composition | | |
| Compound | | Concentration/ |
| No. | Abbreviation | % by weight |
| 1 | CY-3-O2 | 12.0 |
| 2 | CY-3-O4 | 2.0 |
| 3 | CY-5-O2 | 12.0 |
| 4 | CCY-3-O1 | 6.0 |
| 5 | CCY-3-O2 | 8.0 |
| 6 | CCY-4-O2 | 8.0 |
| 7 | CPY-2-O2 | 9.0 |
| 8 | CPY-3-O2 | 9.0 |
| 9 | PYP-2-3 | 5.0 |
| 10 | CC-3-V1 | 5.0 |
| 11 | CC-3-V | 19.0 |
| 12 | CPP-3-2 | 5.0 |
| Σ | | 100.0 |

| Physical properties | |
|---|---|
| T(N, I) = | 86.5° C. |
| $n_e$(20° C., 589 nm) = | 1.5924 |
| $\Delta n$(20° C., 589 nm) = | 0.1092 |
| $\epsilon_\perp$(20°, 1 kHz) = | 7.9 |
| $\Delta\epsilon$(20°, 1 kHz) = | -4.2 |
| $\gamma_1$(20° C.) = | 155 mPa·s |
| $k_{11}$(20° C.) = | 14.6 pN |
| $k_{33}$(20° C.) = | 16.6 pN |
| $V_0$(20° C.) = | 2.08 V |

Mixture M-1 is divided into four parts and investigated as described below.

Firstly, the stability of the voltage holding ratio of mixture (M-1) itself is determined. Mixture M-1 is investigated for its stability to UV exposure in a test cell having an alignment material for homeotropic alignment and flat ITO electrodes. To this end, corresponding test cells are irradiated in the sun test for 30 min. The voltage holding ratio is then determined in each case after 5 minutes at a temperature of 100° C. The results are summarized in Table 1. Here, as below, six test cells are filled and investigated for each individual mixture. The values indicated are the average of the six individual values.

Next, 100 ppm, 200 ppm and 300 ppm of compound I-1 are in each case added to the remaining three parts of mixture M-1, and the resultant mixtures (M-1-1, M-1-2, M-1-3) are investigated for their stability as described above. The results are shown in Table 1 below.

The relative deviations of the voltage holding ratio values in the case of various measurement series are typically in the range from about 3 to 4%.

TABLE 1

| Ex. | Mixture | Stabiliser | c(stab.)/ppm | VHR(t)/% t = 0 h | VHR(t)/% t = 30 min |
|---|---|---|---|---|---|
| (Ref.) | M-1 | none | 0 | 98.3 ± 0.3 | 91 ± 0.2 |
| 1.1 | M-1-1 | I-1 | 100 | 98.7 ± 0.3 | 97 ± 0.5 |
| 1.2 | M-1-2 | I-1 | 200 | 97.6 ± 0.3 | 95 ± 0.5 |
| 1.3 | M-1-3 | I-1 | 300 | 97.8 ± 0.3 | 96 ± 0.5 |

It can readily be seen here that compound I-1, even in relatively low concentrations, exhibits clearly stabilizing properties.

Compound I-1 has excellent stabilization activity in a concentration of 100 ppm. This results in a reduction in the risk of image sticking on exposure to the backlight.

Example 1.4

Mixture M-1 is prepared and divided into two parts. 150 ppm of compound I-1 are added to one part (mixture M-1-4).

Firstly, the stability of the voltage holding ratio of the mixtures as such is determined. The two mixtures are subsequently investigated for their stability to illumination by means of a cold cathode (CCFL) LCD backlight in a test cell having an alignment material for homeotropic alignment and flat ITO electrodes. To this end, corresponding test cells are exposed to the illumination for 900 h. The voltage holding ratio is then determined in each case after 5 minutes at a temperature of 100° C. The results are summarized in Table 2.

TABLE 2

| Ex. | Mixture | Stabiliser | c(stab.)/ppm | VHR(t)/% t = 0 h | VHR(t)/% t = 900 h |
|---|---|---|---|---|---|
| (Ref.) | M-1 | none | 0 | 98.9 ± 0.3 | 89 ± 2 |
| 1.4 | M-1-4 | I-1 | 150 | 97.5 ± 0.5 | 97 ± 0.3 |

As can be seen from Table 2, even a low concentration of compound I-1 results in a considerable improvement in the final value for the VHR after exposure to light of an LCD backlight.

Example 2

The following mixture (M-2) is prepared and investigated.

| Mixture M-2 | | |
|---|---|---|
| Composition | | |
| Compound | | Concentration/ |
| No. | Abbreviation | % by weight |
| 1 | CPP-3-2 | 4.5 |
| 2 | CC-3-V | 23.5 |
| 3 | CC-3-O1 | 4.0 |
| 4 | CCY-3-O2 | 4.0 |
| 5 | CCY-3-O3 | 7.0 |
| 6 | CCY-4-O2 | 8.0 |
| 7 | CLY-3-O2 | 8.0 |
| 8 | CPY-2-O2 | 7.0 |
| 9 | CPY-3-O2 | 11.0 |
| 10 | CY-3-O2 | 11.0 |
| 11 | PY-3-O2 | 12.0 |
| Σ | | 100.0 |
| Physical properties | | |
| $T(N, I) =$ | | 86° C. |
| $n_e(20° C., 589\ nm) =$ | | 1.5962 |
| $\Delta n(20° C., 589\ nm) =$ | | 0.1118 |
| $\epsilon_\perp(20°, 1\ kHz) =$ | | 8.0 |
| $\Delta\epsilon(20°, 1\ kHz) =$ | | -4.3 |
| $\gamma_1(20° C.) =$ | | 143 mPa · s |
| $k_{11}(20° C.) =$ | | 15.0 pN |
| $k_{33}(20° C.) =$ | | 16.7 pN |
| $V_0(20° C.) =$ | | 2.08 V |

Mixture M-2 is divided into two parts, 100 ppm of compound I-2 are added to one part (mixture M-2-1), and the two mixtures are investigated in test cells for their stability to UV exposure in the sun test analogously to the procedure described in Examples 1.1 to 1.3. The results of the VHR measurements after irradiation for 30 min are summarized in Table 3.

TABLE 3

| Ex. | Mixture | Stabiliser | c(stab.)/ppm | VHR(t)/% t = 0 h | VHR(t)/% t = 30 min |
|---|---|---|---|---|---|
| (Ref.) | M-2 | none | 0 | 87.5 ± 2 | 78 ± 4 |
| 2 | M-2-1 | I-2 | 100 | 82.7 ± 2 | 84 ± 2 |

(VHR: 60° C., 1 V, 60 Hz)

As can be seen from Table 3, even a low concentration of compound I-2 results in a considerable improvement in the final value for the VHR after UV exposure.

Example 3 and Comparative Example 3-V

The following mixture (M-3) is prepared and investigated.

| Mixture M-3 | | |
|---|---|---|
| Composition | | |
| Compound | | Concentration/ |
| No. | Abbreviation | % by weight |
| 1 | CCY-3-O1 | 8.0 |
| 2 | CCY-4-O2 | 3.0 |
| 3 | CLY-3-O2 | 8.0 |
| 4 | CLY-3-O3 | 4.0 |
| 5 | CPY-2-O2 | 6.5 |
| 6 | CPY-3-O2 | 4.0 |
| 7 | B-2O—O5 | 4.0 |
| 8 | CC-3-V | 41.5 |
| 9 | PY-1-O4 | 5.0 |
| 10 | PY-3-O2 | 11.5 |
| 11 | CCY-3-O2 | 4.5 |
| Σ | | 100.0 |
| Physical properties | | |
| $T(N, I) =$ | | 76.1° C. |
| $n_e(20° C., 589\ nm) =$ | | 1.5856 |
| $\Delta n(20° C., 589\ nm) =$ | | 0.1025 |
| $\epsilon_\perp(20°, 1\ kHz) =$ | | 7.4 |

-continued

| Mixture M-3 | |
|---|---|
| $\Delta\epsilon(20°, 1\ \text{kHz}) =$ | −3.7 |
| $\gamma_1(20°\ \text{C.}) =$ | 91 mPa · s |
| $k_{11}(20°\ \text{C.}) =$ | 13.9 pN |
| $k_{33}(20°\ \text{C.}) =$ | 14.8 pN |
| $V_0(20°\ \text{C.}) =$ | 2.10 V |

Mixture M-3 is prepared and divided into three parts. 150 ppm of compound I-1 are added to one part (mixture M-3-1). For comparison, 150 ppm of a stabilizer from the prior art (compound VII, mixture V-1) are added to a further part.

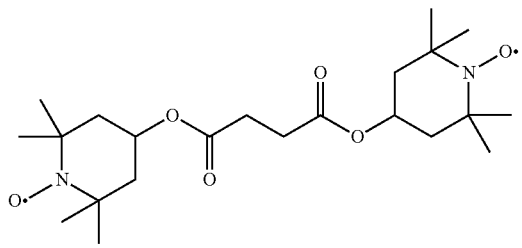

VII

The VHR before and after irradiation for 476 h by means of a cold cathode (CCFL) LCD backlight is investigated analogously to the experiments described above. The results are summarized in Table 4 (the low measurement frequency should be noted).

TABLE 4

| Ex. | Mixture | Stabilizer | c(stab.)/ ppm | VHR(t)/% t = 0 h | VHR(t)/% t = 476 h |
|---|---|---|---|---|---|
| (Ref.) | M-3 | none | 0 | 91.9 ± 1 | 60 ± 4 |
| 3 | M-3-1 | I-1 | 150 | 83.7 ± 2 | 87 ± 2 |
| 3-V | V-1 | VII | 150 | 83.7 ± 2 | 78 ± 4 |

(VHR: 20° C., 1 V, 1 Hz)

As can be seen from Table 4, even a low concentration of compound I-1 results in a considerable improvement in the final value for the VHR after exposure by means of an LCD backlight. Furthermore, comparison of the VHR values of mixtures M-3-1 and V-1 shows that the use of compound I-1 results in even better values for the VHR after exposure than the use of compound VII from the prior art.

Example 4

The following mixture (M-4) is prepared and investigated.

| Mixture M-4 | | |
|---|---|---|
| Composition | | |
| Compound | | Concentration/ |
| No. | Abbreviation | % by weight |
| 1 | CC-3-V | 30.5 |
| 2 | CC-3-V1 | 4.5 |
| 3 | CCY-3-O1 | 6.0 |
| 4 | CCY-3-O2 | 8.0 |
| 5 | CLY-3-O2 | 8.0 |
| 6 | CPY-2-O2 | 8.0 |
| 7 | CPY-3-O2 | 12.0 |
| 8 | CY-3-O2 | 15.0 |
| 9 | PY-3-O2 | 8.0 |
| Σ | | 100.0 |
| Physical properties | | |
| T(N, I) = | | 80.1° C. |
| $n_e(20°\ \text{C.}, 589\ \text{nm}) =$ | | 1.5858 |
| $\Delta n(20°\ \text{C.}, 589\ \text{nm}) =$ | | 0.1033 |
| $\epsilon_\perp(20°, 1\ \text{kHz}) =$ | | 7.6 |
| $\Delta\epsilon(20°, 1\ \text{kHz}) =$ | | −4.0 |
| $\gamma_1(20°\ \text{C.}) =$ | | 113 mPa · s |
| $k_{11}(20°\ \text{C.}) =$ | | 14.4 pN |
| $k_{33}(20°\ \text{C.}) =$ | | 17.0 pN |
| $V_0(20°\ \text{C.}) =$ | | 2.16 V |

Mixture M-4 is divided into three parts, and 100 ppm of compound I-1 or I-2 are in each case added to two of them. The mixtures are subsequently subjected to an exposure test by means of an LCD backlight as described in Example 1.4, and comparably good results are obtained.

Example 5 and Comparative Example 5-V

The following mixture (M-5) is prepared and investigated.

| Mixture M-5 | | |
|---|---|---|
| Composition | | |
| Compound | | Concentration/ |
| No. | Abbreviation | % by weight |
| 1 | CCY-3-O1 | 7.5 |
| 2 | CLY-3-O2 | 10.0 |
| 3 | CPY-2-O2 | 10.0 |
| 4 | CPY-3-O2 | 10.0 |
| 5 | PGIY-2-O4 | 2.5 |
| 6 | CC-3-V | 35.0 |
| 7 | PY-1-O4 | 9.0 |
| 8 | PY-3-O2 | 8.0 |
| 9 | PY-4-O2 | 3.0 |
| 10 | CCY-3-O2 | 5.0 |
| Σ | | 100.0 |
| Physical properties | | |
| T(N, I) = | | 80.0° C. |
| $n_e(20°\ \text{C.}, 589\ \text{nm}) =$ | | 1.6010 |
| $\Delta n(20°\ \text{C.}, 589\ \text{nm}) =$ | | 0.1150 |
| $\epsilon_\perp(20°, 1\ \text{kHz}) =$ | | 7.7 |
| $\Delta\epsilon(20°, 1\ \text{kHz}) =$ | | −4.0 |
| $\gamma_1(20°\ \text{C.}) =$ | | 114 mPa · s |
| $k_{11}(20°\ \text{C.}) =$ | | 14.9 pN |
| $k_{33}(20°\ \text{C.}) =$ | | 15.7 pN |
| $V_0(20°\ \text{C.}) =$ | | 2.09 V |

Mixture M-5 is prepared and divided into three parts. 100 ppm of compound I-1 are added to one part (mixture M-5-1). For comparison, 100 ppm of the stabilizer of the formula VII are added to a further part (mixture V-5). The VHR before and after irradiation for 168 h by means of a cold cathode (CCFL) LCD backlight is determined analogously to the experiments described above. The results are summarized in Table 5.

TABLE 5

| Ex. | Mixture | Stabi-liser | c(stab.)/ ppm | VHR(t)/% | |
|---|---|---|---|---|---|
| | | | | t = 0 h | t = 168 h |
| (Ref.) | M-5 | none | 0 | 83.4 ± 2 | 54.6 ± 4 |
| 5 | M-5-1 | I-1 | 100 | 82.7 ± 2 | 84.4 ± 2 |
| 5-V | V-5 | VII | 100 | 82.5 ± 2 | 79.7 ± 2 |

(VHR: 100° C., 1 V, 60 Hz)

As can be seen from Table 5, even a low concentration of compound I-1 results in a considerable improvement in the final value for the VHR after exposure by means of an LCD backlight. Furthermore, comparison of the VHR values of mixtures M-5-1 and V-5 shows that the use of compound I-1 results in even better values for the VHR after exposure than the use of compound VII from the prior art.

Example 6 and Comparative Example 6-V

The following mixture (M-6) is prepared and investigated.

| Mixture M-6 | | |
|---|---|---|
| Composition | | |
| Compound | | Concentration/ |
| No. | Abbreviation | % by weight |
| 1 | CCY-3-O2 | 7.5 |
| 2 | CPY-2-O2 | 10.0 |
| 3 | CPY-3-O2 | 11.0 |
| 4 | CLY-3-O2 | 5.0 |
| 5 | PGIY-2-O4 | 4.0 |
| 6 | PYP-2-3 | 3.5 |
| 7 | CC-3-V | 36.5 |
| 8 | PP-1-2V1 | 3.0 |
| 9 | CY-3-O2 | 16.5 |
| 10 | B-2O—O5 | 3.0 |
| Σ | | 100.0 |
| Physical properties | | |
| T(N, I) = | | 74.6° C. |
| $n_e$(20° C., 589 nm) = | | 1.5962 |
| Δn(20° C., 589 nm) = | | 0.1110 |
| $\epsilon_\perp$(20° 1 kHz) = | | 7.4 |
| Δε(20°, 1 kHz) = | | −3.7 |
| $\gamma_1$(20° C.) = | | 96 mPa · s |
| $k_{11}$(20° C.) = | | 13.3 pN |
| $k_{33}$(20° C.) = | | 15.0 pN |
| $V_0$(20° C.) = | | 2.13 V |

Mixture M-6 is prepared and divided into three parts. 100 ppm of compound I-1 are added to one part (mixture M-6-1). For comparison, 100 ppm of the stabilizer of the formula VII are added to a further part (mixture V-6). The VHR before and after irradiation for 1000 h by means of a cold cathode (CCFL) LCD backlight is determined analogously to the experiments described above. The results are summarized in Table 6.

TABLE 6

| Ex. | Mixture | Stabi-liser | c(stab.)/ ppm | VHR(t)/% | |
|---|---|---|---|---|---|
| | | | | t = 0 h | t = 1000 h |
| (Ref.) | M-6 | none | 0 | 79.1 ± 2 | 61.5 ± 2 |
| 6 | M-6-1 | I-1 | 100 | 79.2 ± 2 | 66.2 ± 2 |
| 6-V | V-6 | VII | 100 | 80.7 ± 2 | 62.3 ± 2 |

(VHR: 100° C., 1 V, 60 Hz)

As can be seen from Table 6, even a low concentration of compound I-1 results in a considerable improvement in the final value for the VHR after exposure by means of an LCD backlight. Furthermore, comparison of the VHR values of mixtures M-6-1 and V-6 shows that the use of compound I-1 results in even better values for the VHR after exposure than the use of compound VII from the prior art.

Example 7

The following mixture (M-7) is prepared and investigated.

| Mixture M-7 | | |
|---|---|---|
| Composition | | |
| Compound | | Concentration/ |
| No. | Abbreviation | % by weight |
| 1 | CC-3-V | 35.5 |
| 2 | CCP-3-1 | 2.5 |
| 3 | CCY-3-O2 | 9.5 |
| 4 | CLY-3-O2 | 8.0 |
| 5 | CPY-2-O2 | 4.5 |
| 6 | CPY-3-O2 | 10.5 |
| 7 | CY-3-O2 | 14.5 |
| 8 | PGIY-2-O4 | 6.0 |
| 9 | PYP-2-3 | 2.0 |
| 10 | B(S)-2O—O5 | 4.0 |
| 11 | B(S)-2O—O4 | 3.0 |
| Σ | | 100.0 |
| Physical properties | | |
| T(N, I) = | | 85.4° C. |
| $n_e$(20° C., 589 nm) = | | 1.5883 |
| Δn(20° C., 589 nm) = | | 0.1116 |
| $\epsilon_\perp$(20° 1 kHz) = | | 7.9 |
| Δε(20°, 1 kHz) = | | −4.3 |
| $\gamma_1$(20° C.) = | | 113 mPa · s |
| $k_{11}$(20° C.) = | | 15.0 pN |
| $k_{33}$(20° C.) = | | 16.7 pN |
| $V_0$(20° C.) = | | 2.09 V |

Mixture M-7 is prepared and divided into two parts. 100 ppm of compound I-1 are added to one part (mixture M-6-1). The VHR before and after irradiation for 1000 h by means of a cold cathode (CCFL) LCD backlight is determined analogously to the experiments described above. The results are summarized in Table 7.

TABLE 7

| Ex. | Mixture | Stabi-liser | c(stab.)/ ppm | VHR(t)/% | |
|---|---|---|---|---|---|
| | | | | t = 0 h | t = 1000 h |
| (Ref.) | M-7 | none | 0 | 93.6 ± 1 | 72.1 ± 2 |
| M-7 | M-7-1 | I-1 | 100 | 92.2 ± 1 | 86.2 ± 2 |

(VHR: 60° C., 5 V, 1 Hz)

As can be seen from Table 7, even a low concentration of compound I-1 results in a considerable improvement in the final value for the VHR after exposure to light of an LCD backlight.

Without further elaboration, it is believed that one skilled in the art can, using the preceding description, utilize the present invention to its fullest extent. The preceding preferred specific embodiments and examples are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German Application No. 102015006013.9, filed May 13, 2015, are incorporated by reference herein.

The invention claimed is:

1. A liquid-crystalline medium comprising
a) one or more compounds of the formula I,

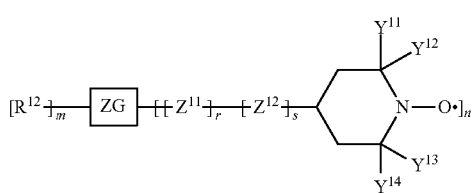

in which
n denotes 3 or 4,
m denotes (4−n),

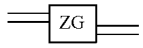

denotes an organic radical having 4 bonding sites, in which, in addition to the m groups $R^{12}$ present in the molecule, but independently thereof, a further H atom may be replaced by $R^{12}$ or a plurality of further H atoms may each be replaced by $R^{12}$ and in which one —$CH_2$— group or a plurality of —$CH_2$— groups may each be replaced by —O— or —(C=O)— in such a way that two O atoms are not bonded directly to one another, or denotes a substituted or unsubstituted aromatic or heteroaromatic hydrocarbon radical having 4 bonding sites, in which, in addition to the m groups $12^{12}$ present in the molecule, but independently thereof, a further H atom may be replaced by $R^{12}$ or a plurality of further H atoms may each be replaced by $R^{12}$, $Z^{11}$ and $Z^{12}$, independently of one another, denote —O—, —(C=O)—, —(N—$R^{14}$)— or a single bond, but do not both simultaneously denote —O—, r and s, independently of one another, denote 0 or 1, $Y^{11}$ to $Y^{14}$ each, independently of one another, denote alkyl having 1 to 4 C atoms, and alternatively, independently of one another, one or both of the pairs ($Y^{11}$ and $Y^{12}$) and ($Y^{13}$ and $Y^{14}$) together also denote a divalent group having 3 to 6 C atoms, $R^{12}$ on each occurrence, independently of one another, denotes H, F, $OR^{14}$, $NR^{14}R^{15}$, a straight-chain or branched alkyl chain having 1-20 C atoms, in which one —$CH_2$— group or a plurality of —$CH_2$— groups may each be replaced by —O— or —C(=O)—, but two adjacent —$CH_2$— groups cannot be replaced by —O—, denotes a hydrocarbon radical which contains a cycloalkyl or alkylcycloalkyl unit and in which one —$CH_2$— group or a plurality of —$CH_2$— groups may each be replaced by —O— or —C(=O)—, but two adjacent —$CH_2$— groups cannot be replaced by —O—, and in which one H atom or a plurality of H atoms may each be replaced by $OR^{14}$, $N(R^{14})(R^{15})$ or $R^{16}$, or denotes an aromatic or heteroaromatic hydrocarbon radical, in which one H atom or a plurality of H atoms may each be replaced by $OR^{14}$, $N(R^{14})(R^{15})$ or $R^{16}$, $R^{14}$ on each occurrence, independently of one another, denotes a straight-chain or branched alkyl or acyl group having 1 to 10 C atoms, or an aromatic hydrocarbon or carboxyl radical having 6-12 C atoms, $R^{15}$ on each occurrence, independently of one another, denotes a straight-chain or branched alkyl or acyl group having 1 to 10 C atoms, or an aromatic hydrocarbon or carboxyl radical having 6-12 C atoms, $R^{16}$ on each occurrence, independently of one another, denotes a straight-chain or branched alkyl group having 1 to 10 C atoms, in which one —$CH_2$— group or a plurality of —$CH_2$— groups may each be replaced by —O— or —C(=O)—, but two adjacent —$CH_2$— groups cannot be replaced by —O—, b) one or more compounds selected from the group of the compounds of the formulae II-1 to II-4,

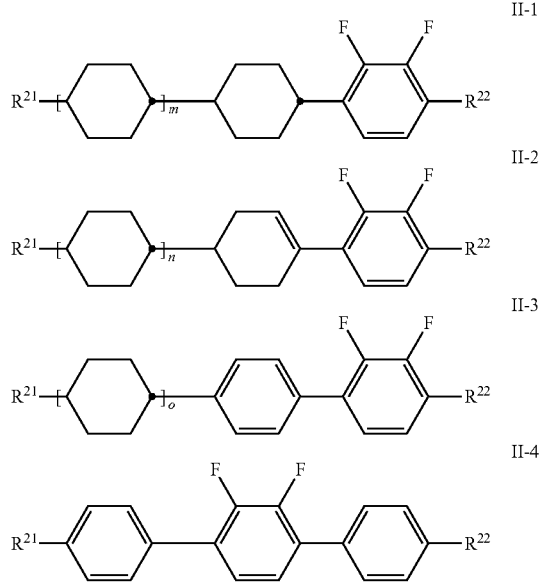

in which $R^{21}$ denotes an unsubstituted alkyl radical having 1 to 7 C atoms, $R^{22}$ denotes an unsubstituted alkyl radical having 1 to 7 C atoms or an unsubstituted alkoxy radical having 1 to 6 C atoms, and m, n and o each, independently of one another, denote 0 or 1, and c) one or more compounds of formula III-3,

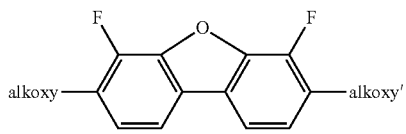

in which alkoxy, alkoxy', independently of one another, denote an alkoxy radical having 1 to 5 C atoms.

2. The medium according to claim 1, wherein the group

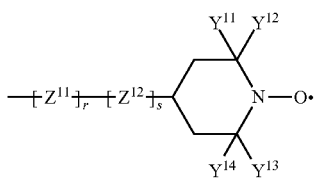

in formula I on each occurrence denotes

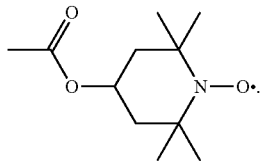

3. The medium according to claim 1, wherein said medium comprises one or more compounds of the formula I selected from the compounds of the formulae I-1 and I-2,

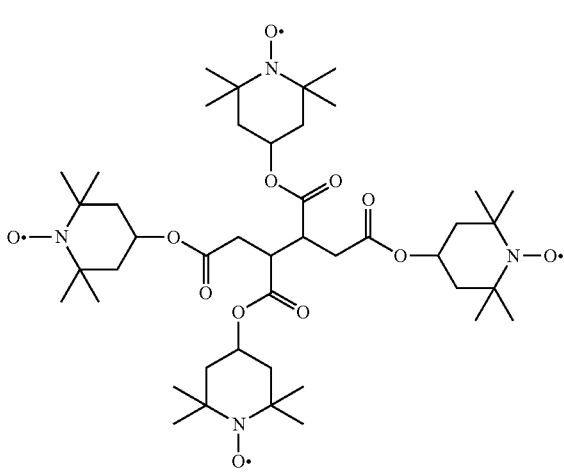

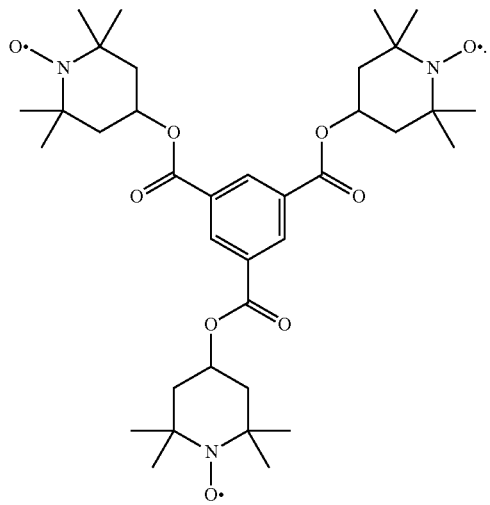

4. The medium according to claim 1, wherein the total concentration of the compounds of the formula I in the medium as a whole is 1 ppm or more to 1000 ppm or less.

5. The medium according to claim 1, wherein said medium additionally comprises one or more compounds of the formula IV,

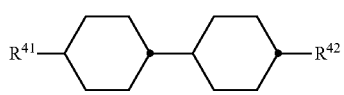

in which $R^{41}$ denotes an unsubstituted alkyl radical having 1 to 7 C atoms or an unsubstituted alkenyl radical having 2 to 7 C atoms, and $R^{42}$ denotes an unsubstituted alkyl radical having 1 to 7 C atoms, an unsubstituted alkoxy radical having 1 to 6 C atoms or an unsubstituted alkenyl radical having 2 to 7 C atoms.

6. The medium according to claim 1, wherein the total concentration of the compounds of the formulae II-1 to II-4 in the medium as a whole is 10% or more to 80% or less.

7. The medium according to claim 1, wherein said medium comprises one or more compounds of the formula II-3.

8. An electro-optical display or electro-optical component comprising a liquid-crystalline medium according to claim 1.

9. The display according to claim 8, wherein said display is based on the VA or ECB effect.

10. The display according to claim 8, wherein said display has an active-matrix addressing device.

11. A method of generating an electro-optical effect comprising applying a voltage to a display according to claim 8.

12. A process for the preparation of a liquid-crystalline medium according to claim 1, comprising mixing one or more compounds of formula I with one or more compounds of the formulae II-1 to II-4 and one or more compounds of formulae III-3.

13. The medium according to claim 1, wherein

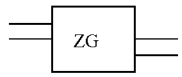

denotes

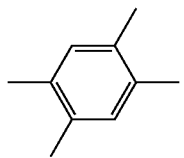

(benzene-1,2,4,5-tetrayl) or straight-chain or branched tetravalent alkyl having 2 to 24 C atoms.

14. The medium according to claim 1, wherein $-[Z^{11}-]_r-[Z^{12}-]_s$ on each occurrence, independently of one another, denotes —O—, —(C=O)—O— or —O—(C=O)—, —(N-R$^{14}$)- or a single bond.

15. The medium according to claim 14, wherein $-[Z^{11}-]_r-[Z^{12}-]$, on each occurrence, independently of one another, denotes —O— or —(C=O)—O— or —O—(C=O)—.

16. The medium according to claim 1, wherein R$^{12}$, if present, denotes alkyl or alkoxy.

17. The medium according to claim 1, wherein said medium comprise one or more compounds of formula II-1.

18. The medium according to claim 1, wherein said one or more compounds of formula II-1 are selected from the compounds of formulae II-1-1 and II-1-2,

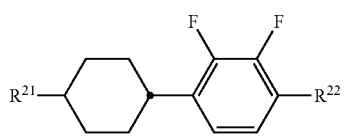

II-1-1

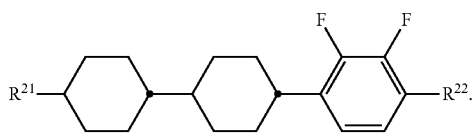

II-1-2

19. The medium according to claim 1, wherein said medium comprise one or more compounds of formula II-2.

20. The medium according to claim 19, wherein said one or more compounds of formula II-2 are selected from the compounds of formulae II-2-1 and II-2-2,

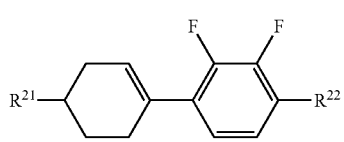

II-2-1

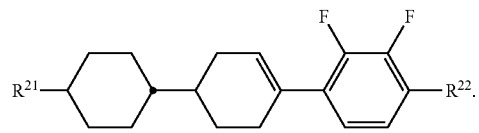

II-2-2

21. The medium according to claim 7, wherein said one or more compounds of formula II-3 are selected from the compounds of formulae II-3-1 and II-3-2,

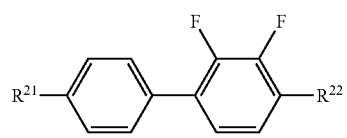

II-3-1

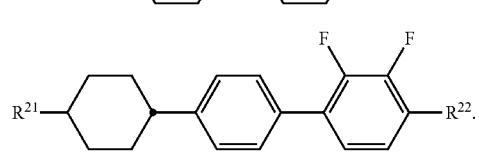

II-3-2

22. The medium according to claim 1, wherein said medium comprise one or more compounds of formula II-4.

23. The medium according to claim 22, wherein said one or more compounds of formula II-4 are selected from the compounds of formula II-4-a,

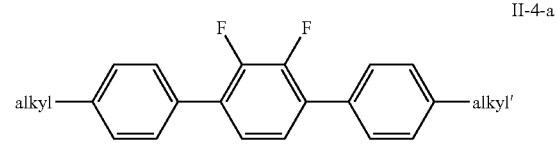

II-4-a in which
alkyl and alkyl', independently of one another, denote alkyl having 1 to 7 C atoms.

24. The medium according to claim 5, wherein said one or more compounds of the formula IV are selected from the compounds of the formulae IV-1 to IV-4,

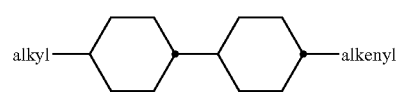

IV-1

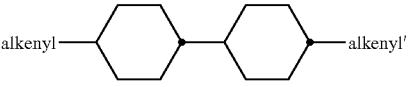

IV-2

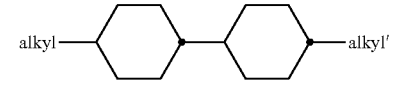

IV-3

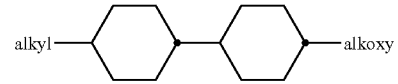

IV-4 in which
alkyl and alkyl', independently of one another, denote alkyl having 1 to 7 C atoms. alkenyl denotes an alkenyl radical having 2 to 5 C atoms, alkenyl' denotes an alkenyl radical having 2 to 5 C atoms, and alkoxy denotes alkoxy having 1 to 5 C atoms.

25. The medium according to claim 24, wherein said one or more compounds of the formula IV are selected from the compounds of formulae IV-1 and IV-2.

26. The medium according to claim 4, wherein the total concentration of the compounds of the formulae II-1 to II-4 in the medium as a whole is 10% or more to 80% or less.

* * * * *